US012682759B2

(12) United States Patent
Seki et al.

(10) Patent No.: US 12,682,759 B2
(45) Date of Patent: Jul. 14, 2026

(54) ALERT MESSAGE DISPLAY DEVICE, ALERT MESSAGE DISPLAY METHOD, AND PROGRAM RECORDING MEDIUM

(71) Applicant: NEC Corporation, Tokyo (JP)

(72) Inventors: Sawaka Seki, Tokyo (JP); Yoko Tanaka, Tokyo (JP); Hitomi Ito, Tokyo (JP); Nozomi Matsumoto, Tokyo (JP); Masaru Yanai, Tokyo (JP); Kosei Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 59 days.

(21) Appl. No.: 18/708,638

(22) PCT Filed: Mar. 24, 2022

(86) PCT No.: PCT/JP2022/013969
§ 371 (c)(1),
(2) Date: May 9, 2024

(87) PCT Pub. No.: WO2023/181256
PCT Pub. Date: Sep. 28, 2023

(65) Prior Publication Data
US 2025/0006059 A1 Jan. 2, 2025

(51) Int. Cl.
*G08G 1/16* (2006.01)
*B60K 35/28* (2024.01)

(52) U.S. Cl.
CPC ............. *G08G 1/167* (2013.01); *B60K 35/28* (2024.01); *G08G 1/162* (2013.01); *G08G 1/166* (2013.01);
(Continued)

(58) Field of Classification Search
CPC ........ G08G 1/167; G08G 1/162; G08G 1/166; B60K 35/28; B60K 2360/797;
(Continued)

(56) References Cited

U.S. PATENT DOCUMENTS

2005/0062642 A1* 3/2005 Aker ........................ G01S 13/52
342/115
2017/0057412 A1* 3/2017 Payne ...................... G08G 1/22
(Continued)

FOREIGN PATENT DOCUMENTS

JP 2001-043493 A 2/2001
JP 2002-178863 A 6/2002
(Continued)

OTHER PUBLICATIONS

International Search Report for PCT Application No. PCT/JP2022/013969, mailed on Jun. 21, 2022.
(Continued)

*Primary Examiner* — Naeem Taslim Alam
(74) *Attorney, Agent, or Firm* — Sughrue Mion, PLLC

(57) ABSTRACT
To suppress the occurrence of accidents when a large passenger vehicle is stopped. This alert message display device is provided with: a stopped time prediction unit that predicts a stopped time for a large passenger vehicle that is stopped or scheduled to be stopped; a sensing unit that senses the surrounding conditions of the large passenger vehicle; and a display control unit that, on the basis of the stopped time and the surrounding conditions of the large passenger vehicle, causes a prescribed display device to display an alert message based on the surrounding conditions of the large passenger vehicle.

11 Claims, 22 Drawing Sheets

(52) U.S. Cl.
CPC .................. *B60K 2360/178* (2024.01); *B60K 2360/1868* (2024.01); *B60K 2360/5915* (2024.01); *B60K 2360/797* (2024.01)

(58) Field of Classification Search
CPC ...... B60K 2360/178; B60K 2360/5915; B60K 2360/1868
See application file for complete search history.

(56) References Cited

U.S. PATENT DOCUMENTS

| | | | |
|---|---|---|---|
| 2017/0256167 A1* | 9/2017 | Kim ........................ | B60K 35/80 |
| 2018/0173237 A1* | 6/2018 | Reiley .................. | B60Q 1/5035 |
| 2018/0257549 A1* | 9/2018 | Suzuki ..................... | B60Q 1/04 |
| 2019/0130874 A1* | 5/2019 | Wafford ................ | G06F 1/1635 |
| 2019/0139414 A1* | 5/2019 | Morimura ........... | G08G 1/0125 |
| 2019/0279508 A1* | 9/2019 | Wang ............... | G08G 1/096725 |
| 2019/0279558 A1* | 9/2019 | Monestier .............. | B60Q 1/543 |
| 2020/0019761 A1* | 1/2020 | Kang ................... | G06V 10/764 |
| 2020/0339126 A1* | 10/2020 | Mielenz ............... | G05D 1/0212 |
| 2021/0046864 A1* | 2/2021 | Elgrably ................ | B60Q 1/324 |
| 2022/0009412 A1* | 1/2022 | Babaev ................ | B60Q 1/5035 |
| 2022/0080879 A1* | 3/2022 | Moon ..................... | F21S 10/06 |
| 2022/0130254 A1* | 4/2022 | Austin ................... | H04W 4/46 |
| 2022/0135081 A1* | 5/2022 | Lee ........................ | G06V 20/58 701/23 |
| 2022/0194362 A1* | 6/2022 | Ueki .............. | B60W 60/00253 |
| 2022/0410796 A1* | 12/2022 | Oya ....................... | B60Q 1/525 |
| 2023/0249614 A1* | 8/2023 | Kim ....................... | B60Q 1/535 340/468 |

FOREIGN PATENT DOCUMENTS

| | | |
|---|---|---|
| JP | 2003-296886 A | 10/2003 |
| JP | 2008-282378 A | 11/2008 |
| JP | 2016-206834 A | 12/2016 |
| JP | 2019-197268 A | 11/2019 |
| JP | 2021-135830 A | 9/2021 |

OTHER PUBLICATIONS

English translation of Written opinion for PCT Application No. PCT/JP2022/013969, mailed on Jun. 21, 2022.

* cited by examiner

Fig.10

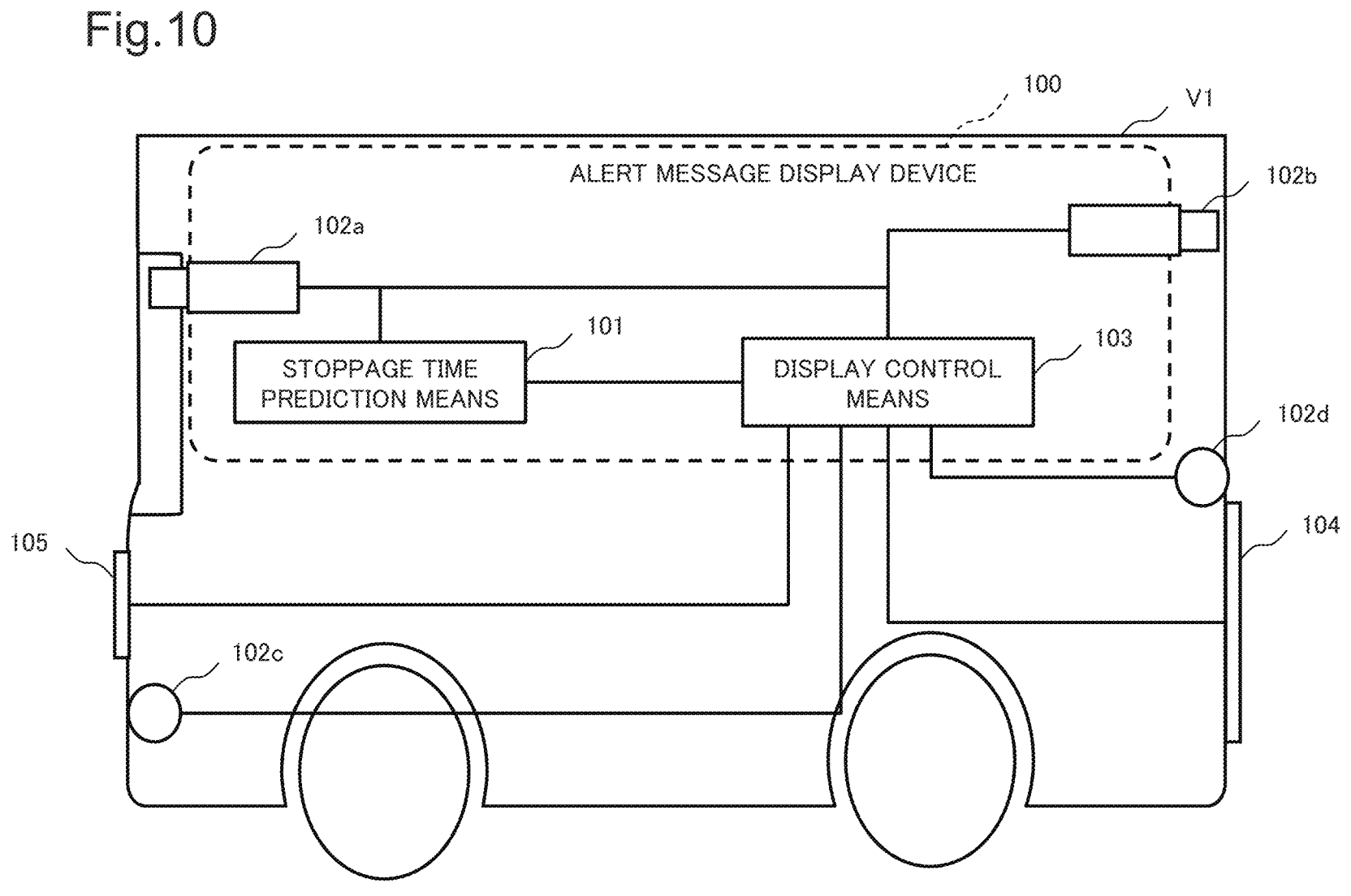

ALERT MESSAGE DISPLAY DEVICE

DISPLAY CONTROL MEANS

STOPPAGE TIME PREDICTION MEANS

Figure 13:
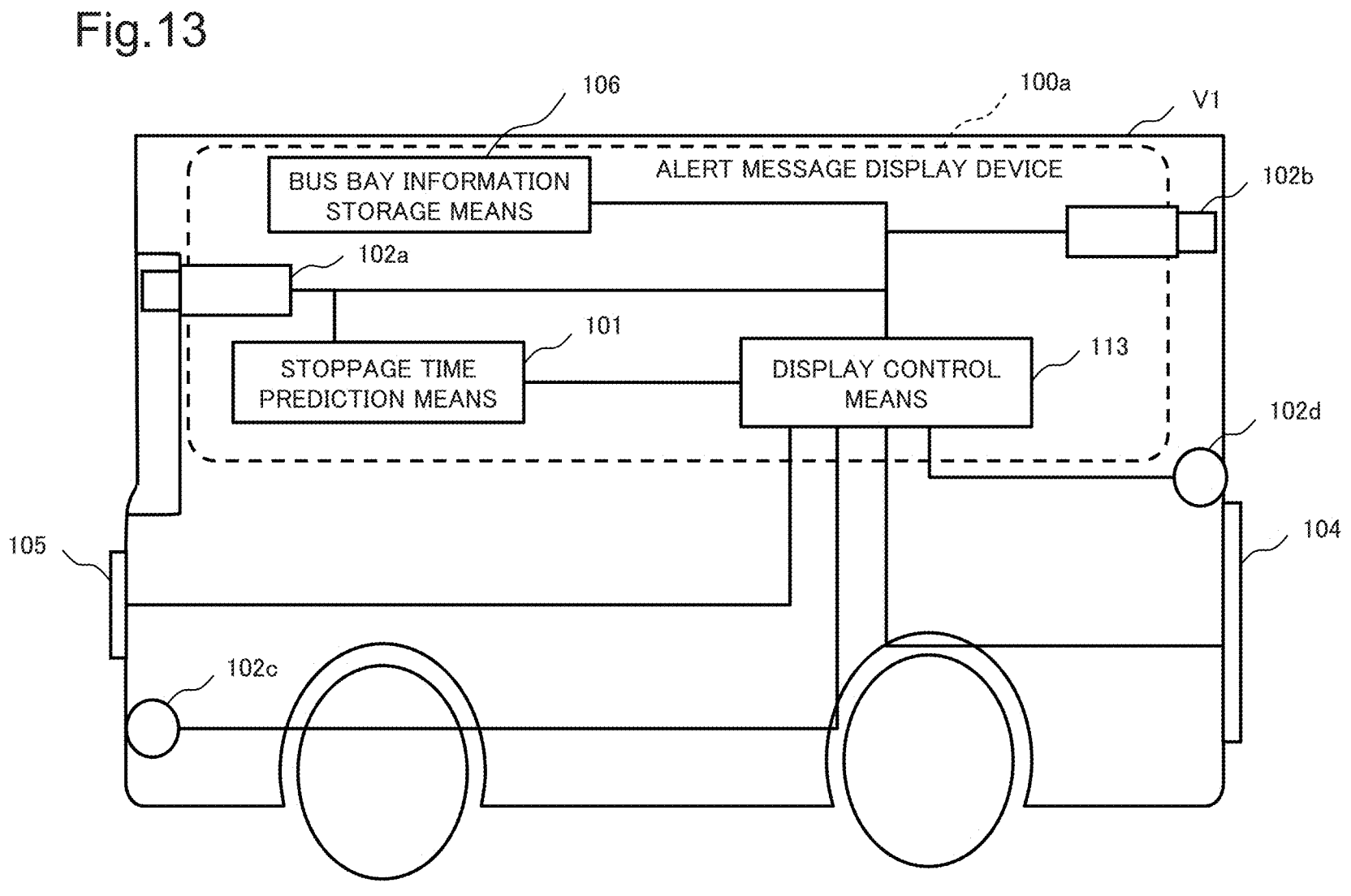

ALERT MESSAGE DISPLAY DEVICE

106    BUS BAY INFORMATION STORAGE MEANS

102a

101    STOPPAGE TIME PREDICTION MEANS

113    DISPLAY CONTROL MEANS

102c

105

ALERT MESSAGE DISPLAY DEVICE, ALERT MESSAGE DISPLAY METHOD, AND PROGRAM RECORDING MEDIUM

This application is a National Stage Entry of PCT/JP2022/013969 filed on Mar. 24, 2022, the contents of all of which are incorporated herein by reference, in their entirety.

TECHNICAL FIELD

The present disclosure relates to an alert message display device, an alert message display method, and a program recording medium.

BACKGROUND ART

When a large passenger vehicle such as a fixed route bus stops at a stop or the like, unsafe overtaking is performed, and an accident with an opposite vehicle or an accident with a pedestrian coming out of the shadow of the large passenger vehicle may occur.

PTL 1 discloses an automobile with an image display device capable of enabling safe overtaking. According to PTL 1, the automobile with the image display device has a camera that captures an image of the front of a large automobile and a function of displaying the image of the front captured by the camera on a display device at the rear of the large automobile.

PTL 2 discloses a bus getting-on/off stoppage time prediction device that predicts when a bus stopped at a stop departs and displays the predicted departure time on a rear display device at the rear of the bus.

CITATION LIST

Patent Literature

PTL 1: JP 2001-043493 A
PTL 2: JP 2019-197268 A
PTL 3: JP 2021-135830 A

SUMMARY OF INVENTION

Technical Problem

In the automobile with the image display device of PTL 1, since the image of the front of the large automobile is projected, there is a possibility that the following vehicle is urged to overtake. As a result, it is conceivable that an accident with an opposite vehicle or a pedestrian coming out of the side is caused. In particular, when the stoppage time for the bus is also displayed as in PTL 2, there is a possibility that the following vehicle is more strongly urged to overtake. PTL 3 discloses a technology of acquiring information around a bus, determining whether it is possible to overtake the bus, and issuing an alert.

An object of the present disclosure is to provide an alert message display device, an alert message display method, and a program recording medium capable of suppressing an accident that occurs when a large passenger vehicle stops.

According to the first viewpoint, an alert message display device including a stoppage time prediction unit that predicts a stoppage time for a large passenger vehicle that is stopped or scheduled to be stopped, a sensing unit that senses a surrounding condition of the large passenger vehicle, and a display control unit that displays an alert message based on the surrounding condition of the large passenger vehicle on a predetermined display device, based on the stoppage time and the surrounding condition of the large passenger vehicle, is provided.

According to the second viewpoint, an alert message display method including predicting a stoppage time for a large passenger vehicle that is stopped or scheduled to be stopped, sensing a surrounding condition of the large passenger vehicle, and displaying an alert message based on the surrounding condition of the large passenger vehicle on a predetermined display device, based on the stoppage time and the surrounding condition of the large passenger vehicle, is provided.

According to the third viewpoint, a program for allowing a computer to execute processing of predicting a stoppage time for a large passenger vehicle that is stopped or scheduled to be stopped, processing of sensing a surrounding condition of the large passenger vehicle, and processing of displaying an alert message based on the surrounding condition of the large passenger vehicle on a predetermined display device, based on the stoppage time and the surrounding condition of the large passenger vehicle, is provided.

Advantageous Effects of Invention

According to the present disclosure, the alert message display device, the alert message display method, and the program capable of suppressing the accident that occurs when the large passenger vehicle stops are provided.

FIG. 10 is a diagram illustrating a configuration of a first example embodiment of the present disclosure.

FIG. 13 is a diagram illustrating a configuration of a second example embodiment of the present disclosure.

Figure 1:
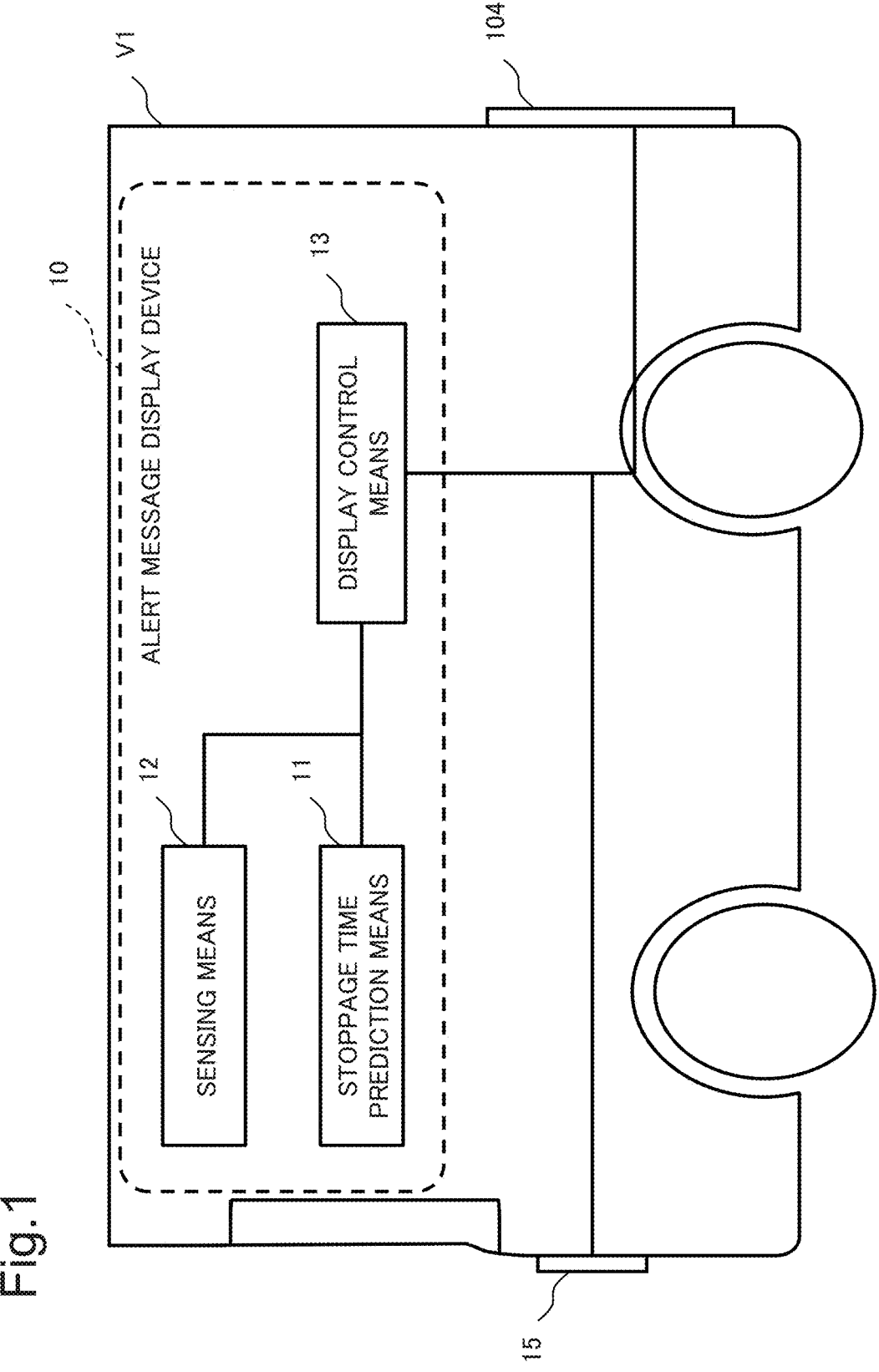
FIG. 1 is a diagram illustrating a configuration of one example embodiment of the present disclosure.

First, the outline of one example embodiment of the present disclosure will be described with reference to the drawings. The reference numerals in the drawings attached to the outline are attached to each element for convenience as an example for assisting the understanding, and are not intended to limit the present disclosure to the illustrated aspects. A connection line between blocks in the drawings and the like referred to in the following description includes both bidirectional and unidirectional lines. A unidirectional arrow schematically indicates the flow of a main signal (data), and does not exclude bidirectionality. A program is executed via a computer device, and the computer device includes, for example, a processor, a storage device, an input device, a communication interface, and a display device as necessary. The computer device is configured to be capable of communicating with a device (including a computer) inside or outside the device via the communication interface in a wired or wireless manner. There are a port and an interface at a connection point between input and output of each block in the drawings, but the port and the interface are not illustrated.

In the example embodiment, as illustrated in FIG. 1, the present disclosure can be enabled by an alert message display device 10 including a stoppage time prediction unit 11, a sensing unit 12, and a display control unit 13.

More specifically, the stoppage time prediction unit 11 predicts a stoppage time for a large passenger vehicle V1 that is stopped or scheduled to be stopped. As a method for predicting the stoppage time, a method for estimating the stoppage time from past information such as statistical information relevant to the behavior of the large passenger vehicle V1 at each stoppage position and statistical information of the number of passengers of the large passenger vehicle V1 at each stoppage position can be used. As another method for predicting the stoppage time, the stoppage time can be calculated by summing the time required for each person to get on and off, based on the number of passengers scheduled to get off among passengers currently boarding on the large passenger vehicle V1 and the number of passengers waiting at the stoppage position.

The sensing unit 12 includes one or more sensors that sense the surrounding condition of the large passenger vehicle V1. As a specific example of the sensing unit 12, an in-vehicle camera, light detection and ranging (LiDAR), a millimeter-wave radar, or the like can be used.

The display control unit 13 displays an alert message based on the surrounding condition of the large passenger vehicle on predetermined display devices 14 and 15, based on the predicted stoppage time and the surrounding condition of the large passenger vehicle. As the display devices 14 and 15, for example, a display device installed on the outer surface of the large passenger vehicle V1 can be used.

Figure 2:
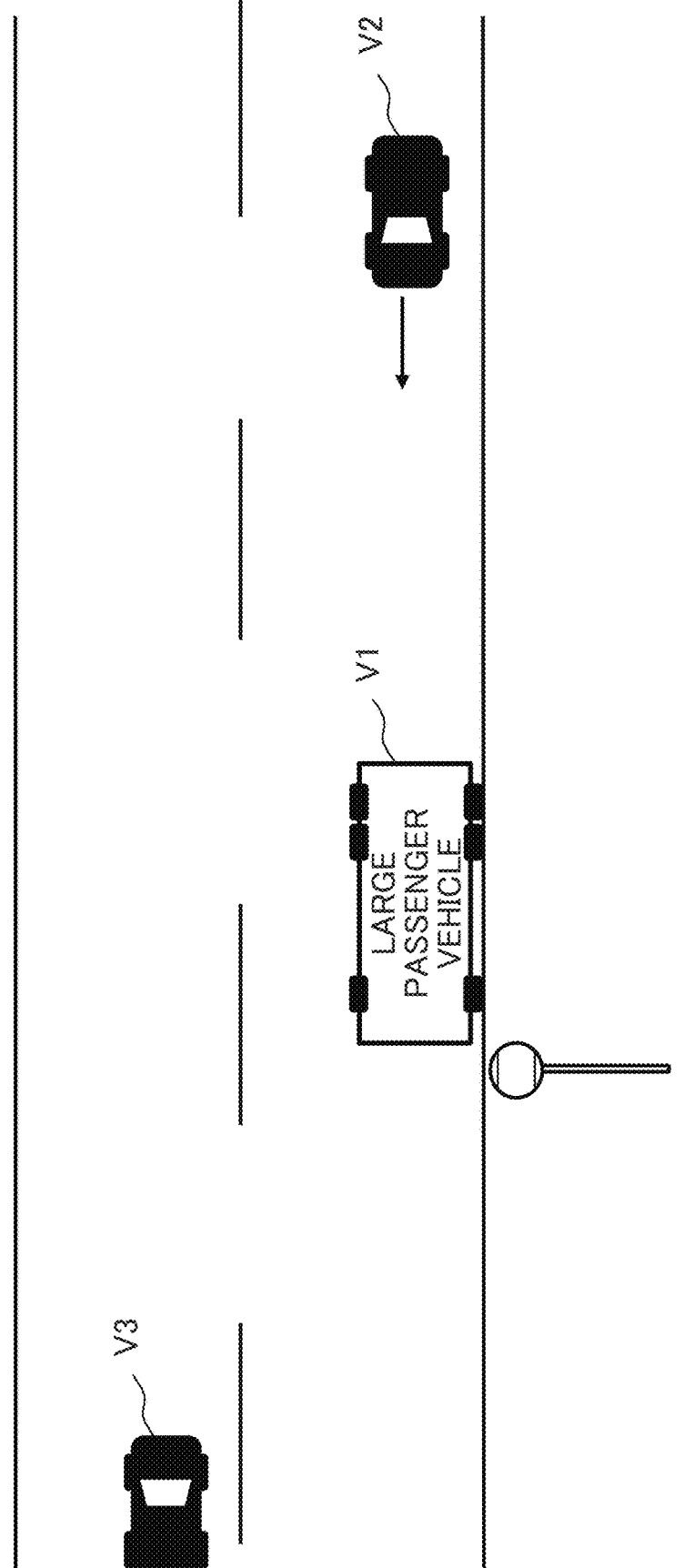
FIG. 2 is a diagram for illustrating an operation of one example embodiment of the present disclosure.
Figure 3:
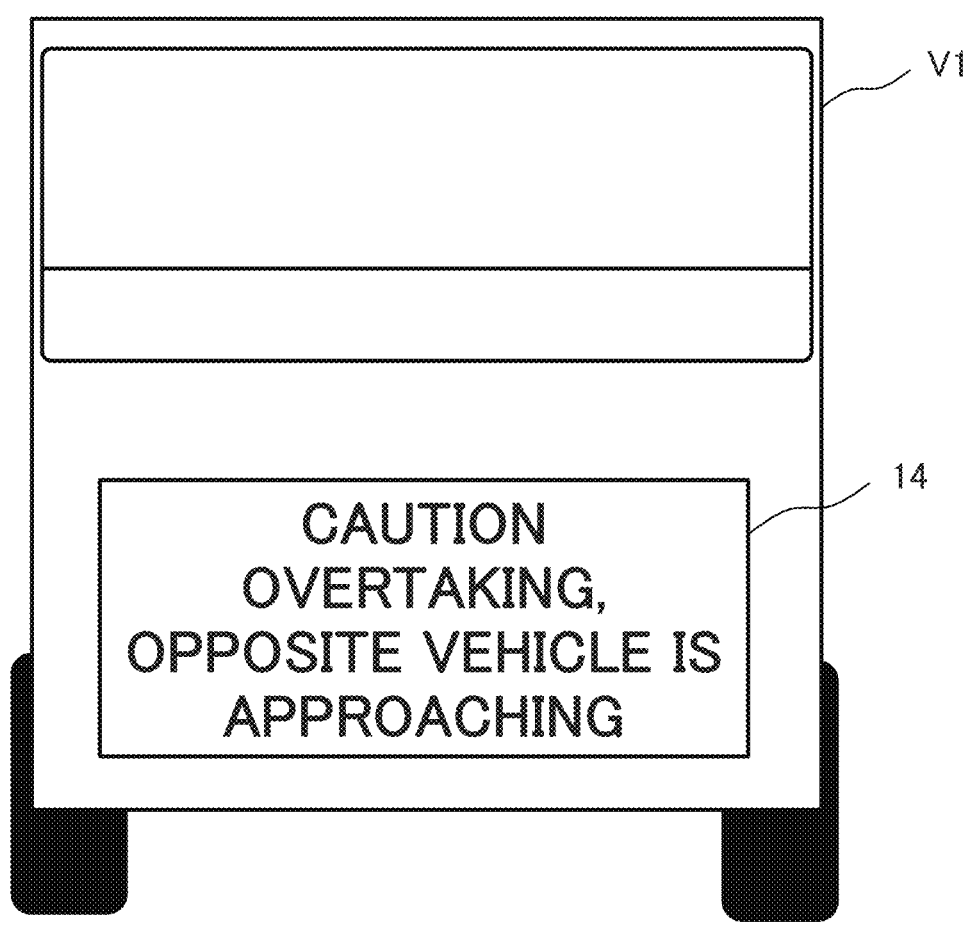
FIG. 3 is a diagram for illustrating an operation of one example embodiment of the present disclosure.

Hereinafter, the operation of the present example embodiment will be described by using an example of the surrounding condition of the large passenger vehicle and an example of the alert message displayed at this time. For example, as illustrated in FIG. 2, in a case where it is detected that a vehicle V3 is approaching from an opposite lane during the predicted stoppage time, the alert message display device 10 displays the alert message on the display device 14 installed at the rear of the vehicle body of the large passenger vehicle. FIG. 3 is an example of the alert message created by the alert message display device 10 under the condition of FIG. 2. As illustrated in FIG. 3, by displaying an alert message of "Caution overtaking, opposite vehicle is approaching" on the display device 14 installed at a position visually recognizable from the rear side of the large passenger vehicle, it is possible to appropriately issue an alert to a following vehicle V2 in FIG. 2.

Figure 4:
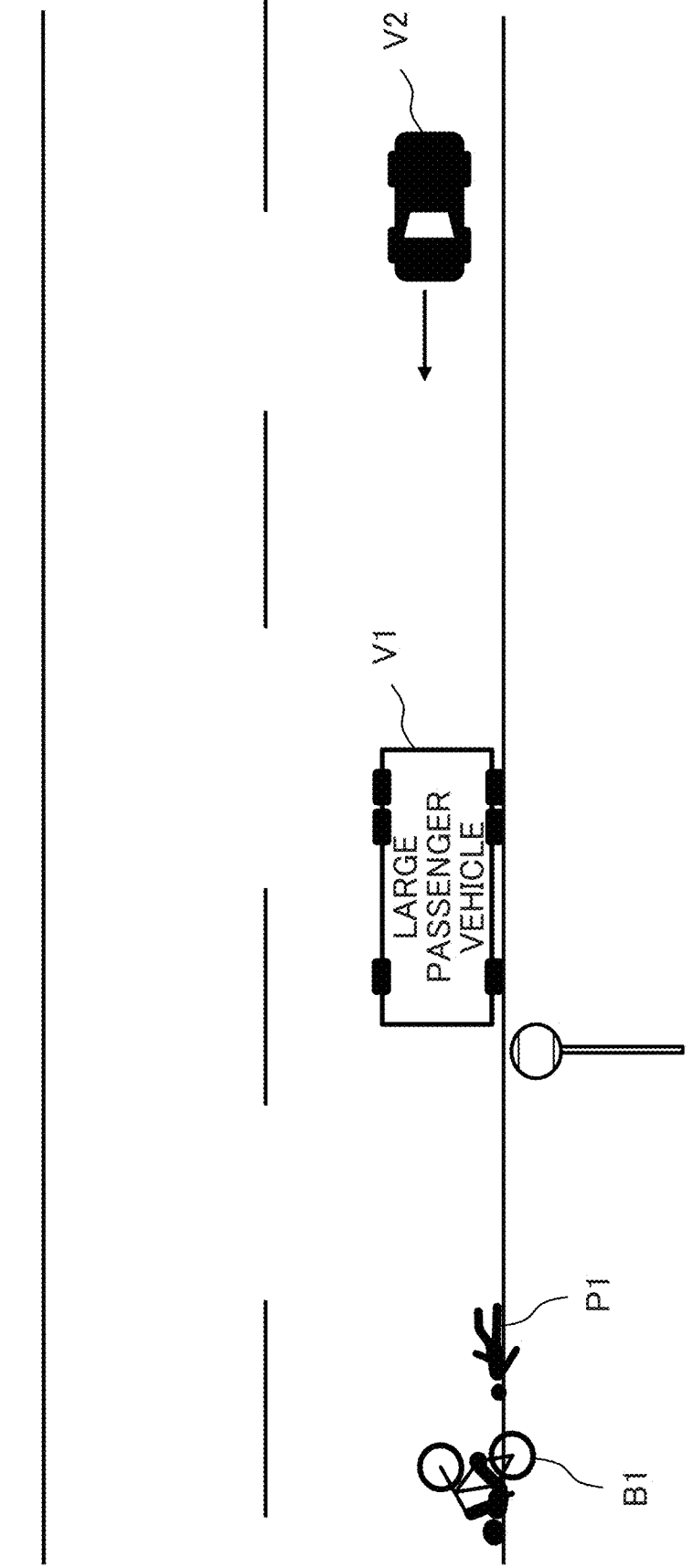
FIG. 4 is a diagram for illustrating an operation of one example embodiment of the present disclosure.
Figure 5:
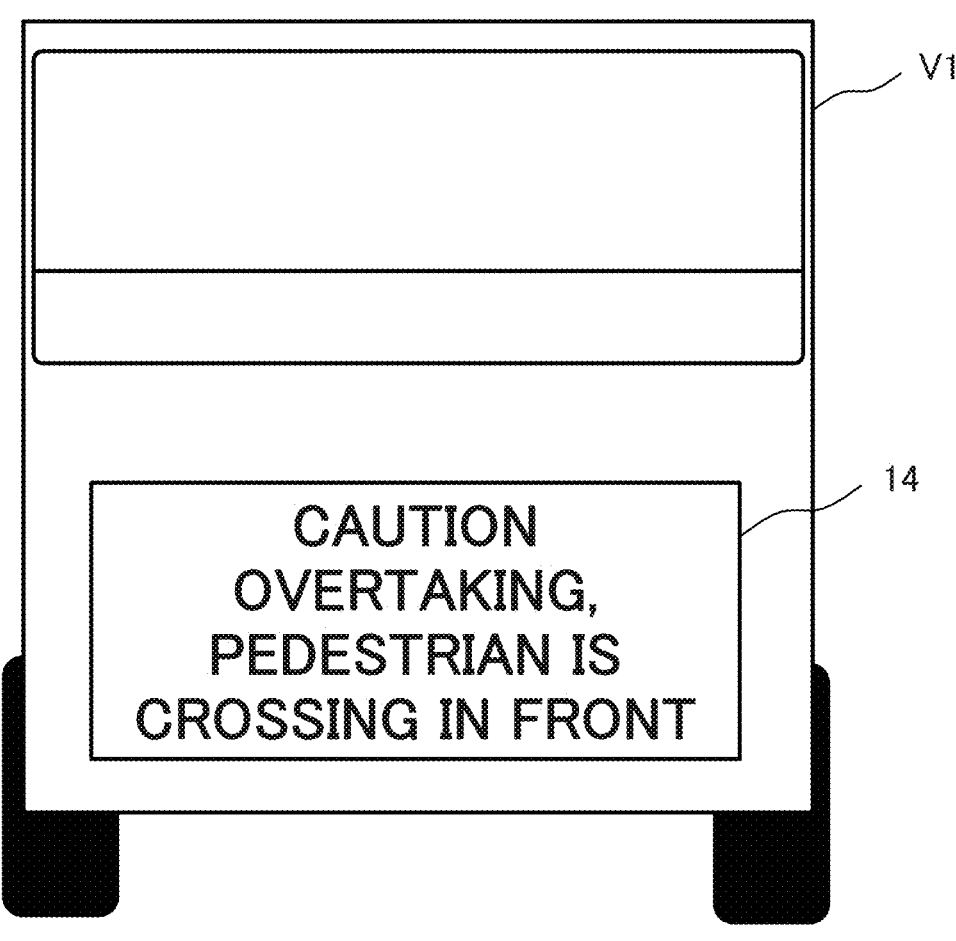
FIG. 5 is a diagram for illustrating an operation of one example embodiment of the present disclosure.

A sensing target of the sensing unit 12 is not limited to the vehicle. For example, as illustrated in FIG. 4, in a case where it is detected that there is a pedestrian P1 or a bicycle B1 crossing a road in front of the large passenger vehicle V1 during the predicted stoppage time, the alert message display device 10 displays the alert message on the display device 14 installed at the rear of the vehicle body of the large passenger vehicle. FIG. 5 is an example of the alert message created by the alert message display device 10 under the condition of FIG. 4. As illustrated in FIG. 5, by displaying an alert message of "Caution overtaking, pedestrian is crossing in front" on the display device 14 installed at the position visually recognizable from the rear side of the large passenger vehicle, it is possible to appropriately issue an alert to the following vehicle V2 in FIG. 4.

Figure 6:
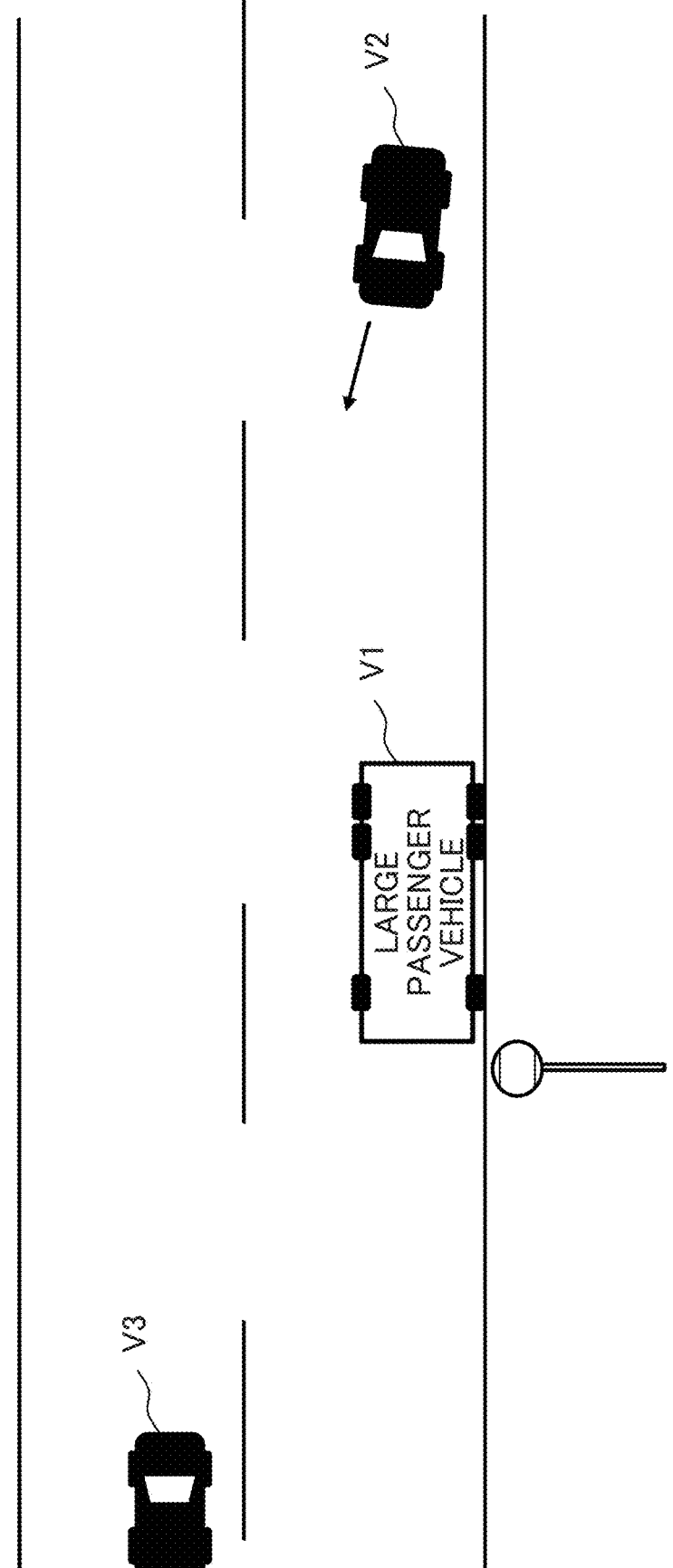
FIG. 6 is a diagram for illustrating an operation of one example embodiment of the present disclosure.
Figure 7:
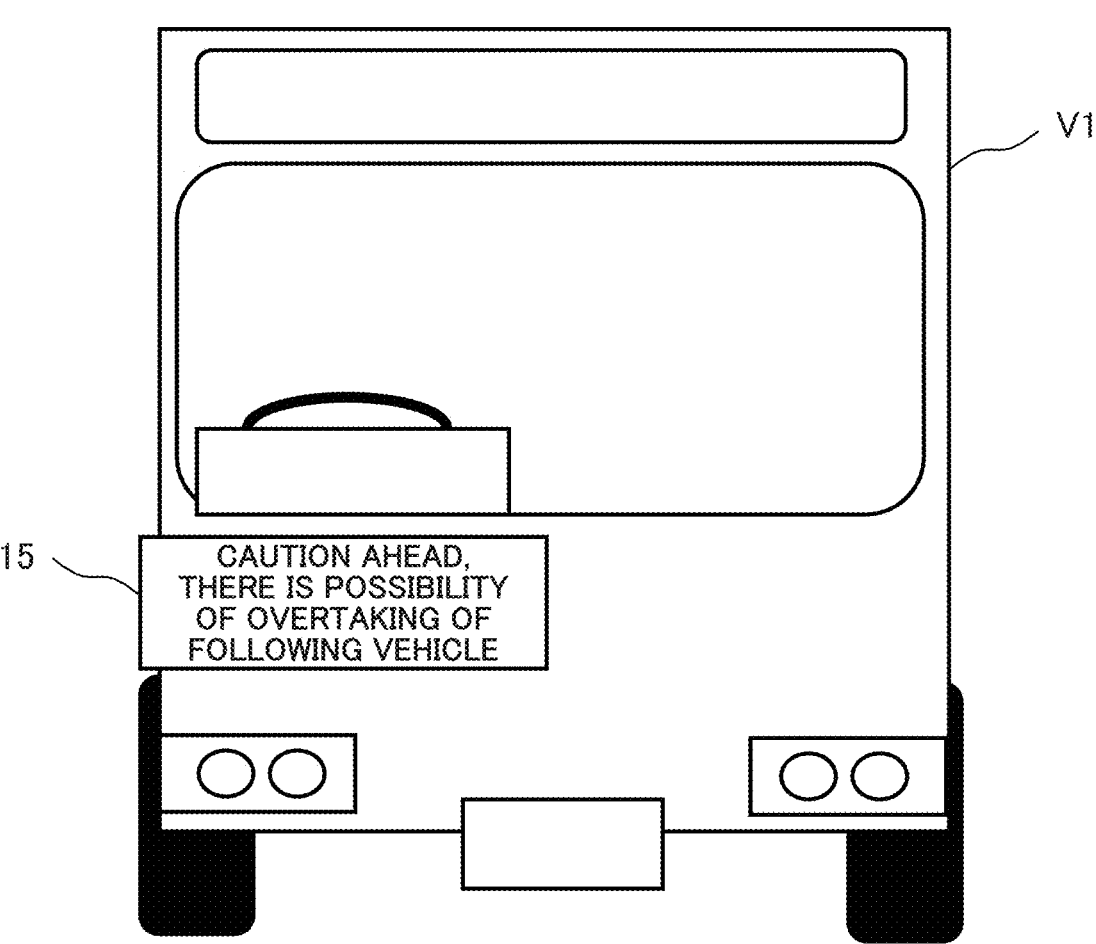
FIG. 7 is a diagram for illustrating an operation of one example embodiment of the present disclosure.

A sensing range of the sensing unit 12 is not limited to the front side of the vehicle. For example, as illustrated in FIG. 6, in a case where it is determined that the following vehicle V2 will overtake the large passenger vehicle V1 during the predicted stoppage time, the alert message display device 10 displays the alert message on the display device 15 installed at the front of the vehicle body of the large passenger vehicle. FIG. 7 is an example of the alert message created by the alert message display device 10 under the condition of FIG. 6. As illustrated in FIG. 7, by displaying an alert message of "Caution ahead, there is possibility of overtaking of following vehicle" on the display device 15 installed at a position visually recognizable from the front side of the large passenger vehicle, it is possible to appropriately issue an alert to the opposite vehicle V3 in FIG. 6. Whether the following vehicle V2 performs overtaking can be determined from the lighting state of the direction indicator of the following vehicle V2, the speed, the position, the direction, and the like of the vehicle. The following vehicle V2 may be a motorcycle, and the alert message may be displayed in a case where overtaking or passing by the motorcycle is detected.

Figure 8:
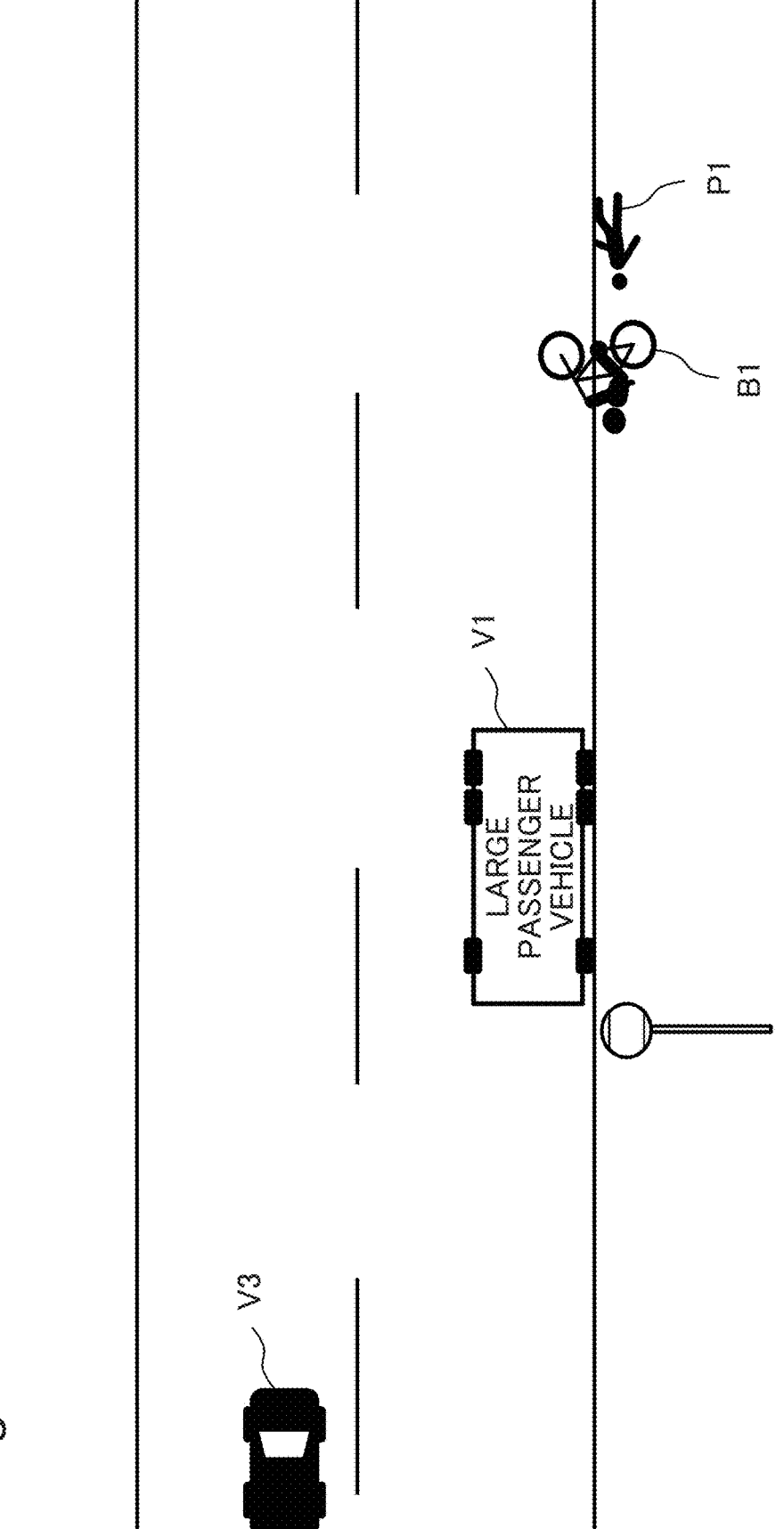
FIG. 8 is a diagram for illustrating an operation of one example embodiment of the present disclosure.
Figure 9:
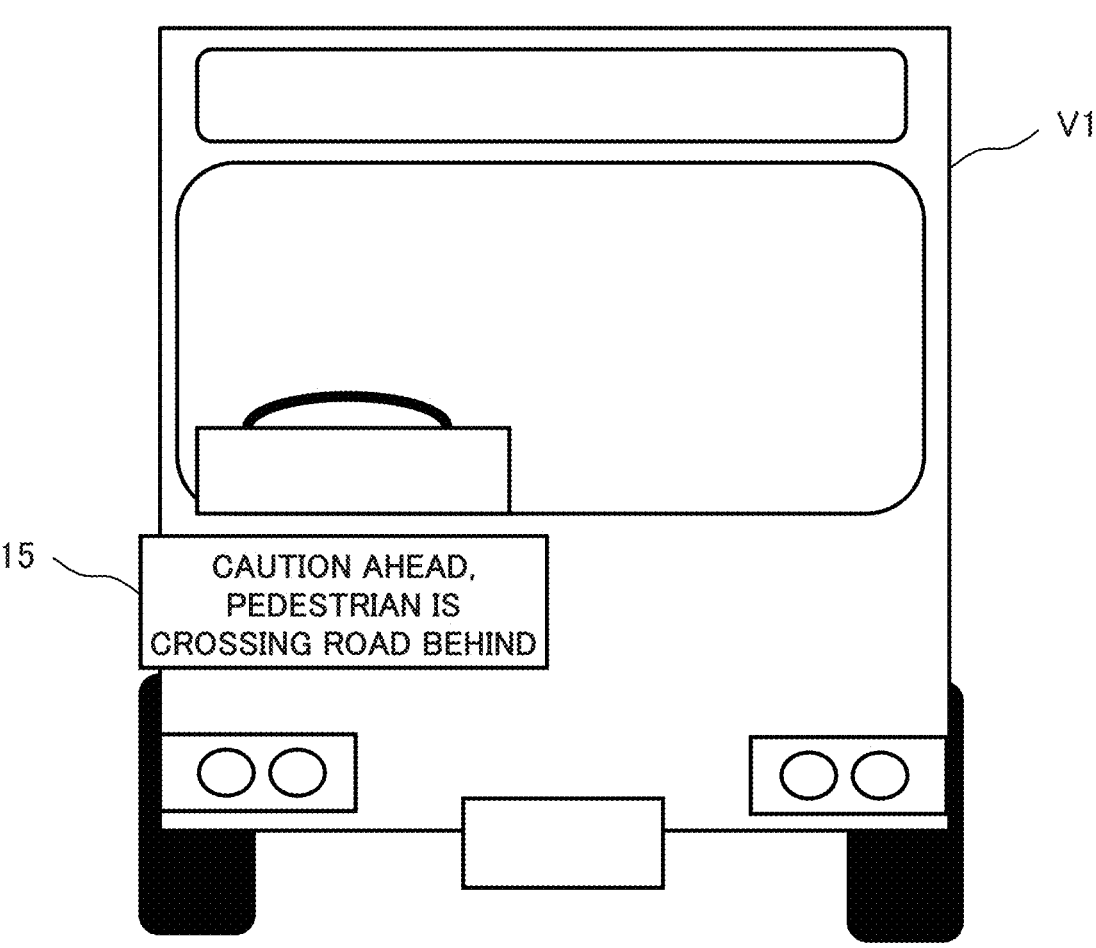
FIG. 9 is a diagram for illustrating an operation of one example embodiment of the present disclosure.

In the case of sensing the front side of the vehicle, the sensing target is not also limited to the vehicle. For example, as illustrated in FIG. 8, in a case where it is determined that there is the pedestrian P1 or the bicycle B1 crossing a road behind the large passenger vehicle V1 during the predicted stoppage time, the alert message display device 10 displays the alert message on the display device 15 installed at the front of the vehicle body of the large passenger vehicle. FIG. 9 is an example of the alert message created by the alert message display device 10 under the condition of FIG. 8. As illustrated in FIG. 9, by displaying an alert message of "Caution ahead, pedestrian is crossing road behind" on the display device 15 installed at the position visually recognizable from the front side of the large passenger vehicle, it is possible to appropriately issue an alert to the opposite vehicle V3 in FIG. 8.

The surrounding condition of the large passenger vehicle V1 illustrated in FIGS. 2, 4, 6, and 8 and the contents of the alert message displayed at this time are merely an example, and are not limited to the contents illustrated in FIGS. 3, 5, 7, and 9. For example, the alert message display device 10 may display the predicted stoppage time in the alert message in a visually easy-to-understand form by a numerical value or a figure. In a case where a camera is provided as the sensing unit 12, an image captured by the camera may be displayed together.

First Example Embodiment

Next, a first example embodiment of the present disclosure in which the present disclosure is applied to a bus equipped with a plurality of sensors will be described in detail with reference to the drawings. FIG. 10 is a diagram illustrating the configuration of the first example embodiment of the present disclosure. Referring to FIG. 10, the configuration of an alert message display device 100 including a stoppage time prediction unit 101, two cameras 102a and 102b, two LiDARs 102c and 102d, and a display control unit 103 is illustrated. A bus V1 includes display devices 104 and 105 at the front and rear of the vehicle.

The camera 102a is a camera that captures an image of the front of the large passenger vehicle (hereinafter, the bus) V1. The camera 102b is a camera that captures an image of the rear of the bus V1. It is not necessary to limit the number of cameras to two, and another camera may be arranged. Such cameras may not be dedicated to the alert message display device 100, and may be, for example, a drive recorder or a camera for driving assistance.

The LiDAR 102c is used to measure the shape and the distance of an obstacle or the like in front of the bus V1. The LiDAR 102d is used to measure the shape and the distance of an obstacle or the like behind the bus V1. The number of LiDARs is not limited to two, and another LiDAR may be arranged. Such LiDARs may not be dedicated to the alert message display device 100, and may be, for example, LiDAR for driving assistance.

The stoppage time prediction unit 101 predicts a stoppage time at the next bus stop by summing the time required for each person to get on and off, based on the number of passengers scheduled to get off among passengers currently boarding on the bus V1 and the number of passengers waiting at the next bus stop. As the number of passengers scheduled to get off among passengers boarding on the bus V1, an average value of the past number of passengers getting off in the same time zone on the same day or the like can be used. As the number of passengers waiting at the next bus stop, an average value of the past number of passengers in the same time zone on the same day, the number of passengers appearing in the image of the camera 102a, or the like can be used. As the number of passengers scheduled to get off among passengers boarding on the bus V1, a value estimated from the number of passengers lining up at the exit may be used.

The display control unit 103 determines contents to be displayed on the display devices 104 and 105 within the stoppage time predicted by the stoppage time prediction unit 101, and performs display control on the display devices 104 and 105. More specifically, the display control unit 103 creates an alert message based on the surrounding condition of the large passenger vehicle, based on the predicted stoppage time and the surrounding condition of the large passenger vehicle. The display control unit 103 displays the created alert message on the display devices 104 and 105 installed on the outer surface of the large passenger vehicle V1.

The alert message display device 100 described above may include a dedicated device, but can also be enabled, for example, by installing a computer program for enabling functions associated to the stoppage time prediction unit 101 and the display control unit 103 in an in-vehicle terminal mounted on the bus V1.

Figure 11:
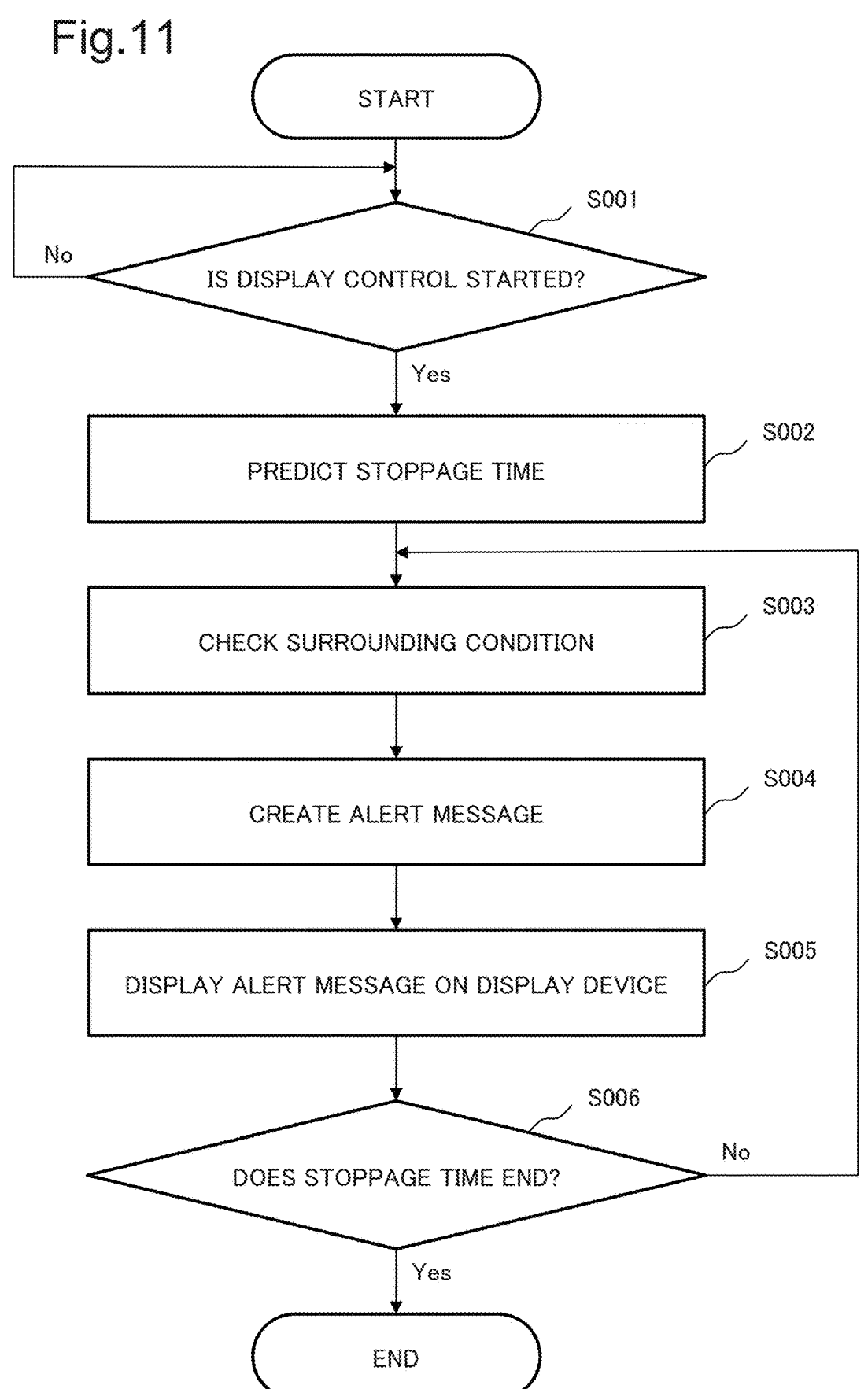
FIG. 11 is a flowchart illustrating an operation of an alert message display device of the first example embodiment of the present disclosure.

Subsequently, an alert message display method used in the alert message display device 100 of the present example embodiment will be described in detail with reference to the drawings. FIG. 11 is a flowchart illustrating an operation of the alert message display device 100 of the first example embodiment of the present disclosure. Referring to FIG. 11, first, the alert message display device 100 checks whether to start the display control on the display devices 104 and 105 (step S001). Whether to start the display control on the display devices 104 and 105 may be determined by, for example, whether the bus V1 is in a stoppage state or whether the bus V1 is approaching a bus stop.

As a result of the determination, in a case where it is determined to start the display control on the display devices 104 and 105 (Yes in step S001), the alert message display device 100 predicts the stoppage time for the bus V1 (step S002).

Next, the alert message display device 100 checks the surrounding condition of the bus V1 based on the sensing data of the cameras 102a and 102b and the LiDARs 102c and 102d (step S003).

Figure 12:
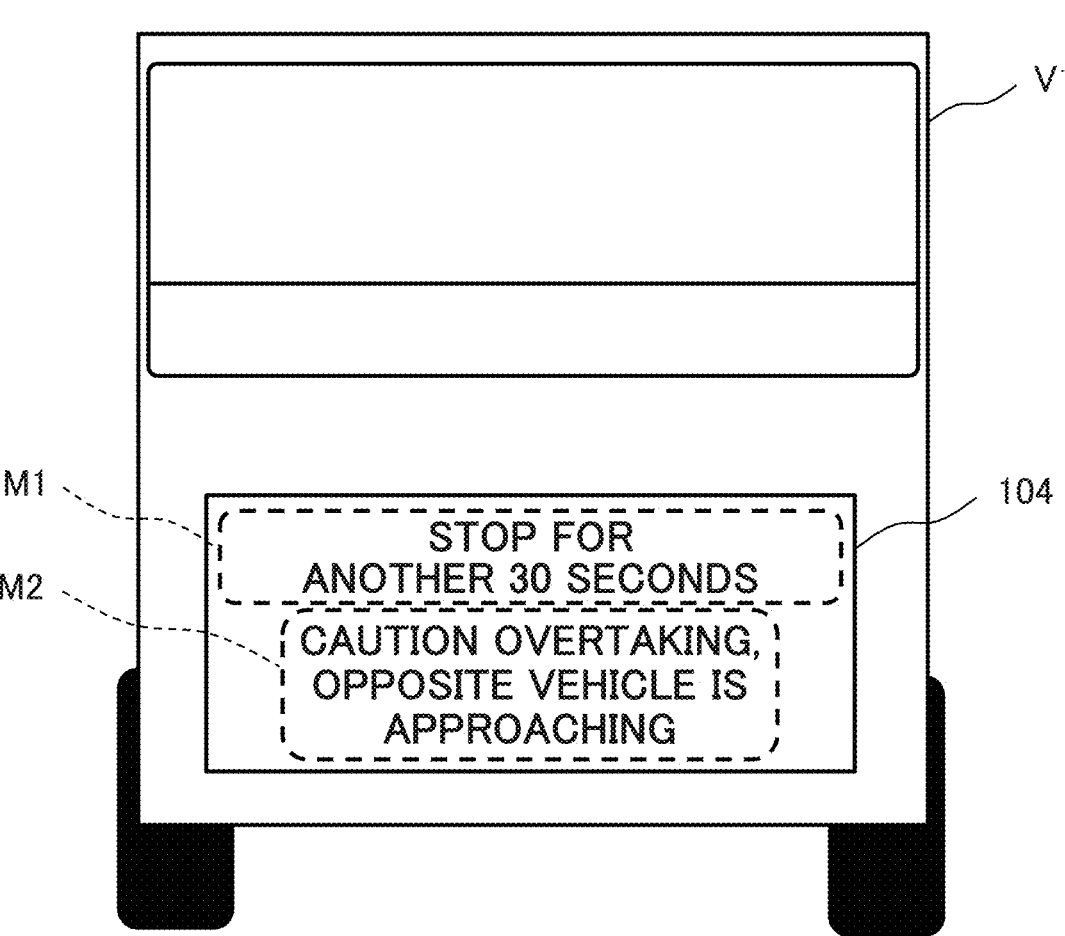
FIG. 12 is a diagram for illustrating the operation of the alert message display device according to the first example embodiment of the present disclosure.

Next, the alert message display device 100 creates an alert message to be displayed on the display devices 104 and 105 by using the predicted stoppage time and the surrounding condition of the bus V1 (step S004). For example, as illustrated in FIG. 2 described above, in a case where the opposite vehicle V3 is detected, the alert message display device 100 creates an alert message displaying "Stop for another 30 seconds" and "Caution overtaking, opposite vehicle is approaching" as illustrated in FIG. 12.

Next, the alert message display device 100 displays the created alert message on the display devices 104 and 105 (step S005). In the example of FIG. 12, the alert message display device 100 displays a message M1 of "Stop for another 30 seconds" indicating the predicted stoppage time on the upper side of the display device 104. In the example of FIG. 12, the alert message display device 100 displays a message M2 of "Caution overtaking, opposite vehicle is approaching" based on the surrounding condition on the lower side of the display device 104.

The alert message display device 100 continues the operations in steps S003 to S005 until the stoppage time ends (No in step S006). In a case where the stoppage time ends, the alert message display device 100 ends the display on the display devices 104 and 105 (Yes in step S106). When the stoppage time ends, the alert message display device 100 may display, for example, "Departure" on the display devices 104 and 105. The alert message display device 100 may display various advertisements or the like on the display devices 104 and 105 during a period until the next alert message is displayed after the stoppage time ends.

By displaying the alert message as described above, the following vehicle V2 of the bus V1 in FIG. 2 recognizes that there is an opposite vehicle and refrains from overtaking the bus V1. In this case, since the display device 104 displays that the time to wait is 30 seconds, the driver of the following vehicle V2 can wait for the departure of the bus V1 with ease without performing unsafe overtaking.

Second Example Embodiment

Subsequently, a second example embodiment in which a function of guiding a spot where the overtaking is available is added to the alert message display device 100 of the first example embodiment will be described in detail with reference to the drawings. FIG. 13 is a diagram illustrating the configuration of an alert message display device 100*a* of the second example embodiment of the present disclosure. A difference from the first example embodiment illustrated in FIG. 10 is that a bus bay information storage unit 106 is added to the alert message display device 100*a* and the operation of a display control unit 113 is changed. Since the other configurations are the same as those of the first example embodiment, the difference will be mainly described below. Hereinafter, the "bus bay" refers to a platform configured by providing a depression on the sidewalk in such a way that a bus or the like may stop off from the flow of the traffic. The bus bay is also referred to as a bus cut, a bus turn-out, a bus pull-out, a bus lay-by, or the like.

The bus bay information storage unit 106 stores bus bay information indicating whether there is a bus bay at a bus stop on a traveling route of the bus V1. The form of the bus bay information may be a map form, but may be simply information in which the presence or absence of the bus bay is recorded in a bus stop ID managed on the alert message display device 100*a* side.

Similarly to the display control unit 103 of the first example embodiment, the display control unit 113 of the alert message display device 100*a* creates an alert message based on the surrounding condition of the large passenger vehicle, based on the predicted stoppage time and the surrounding condition of the large passenger vehicle. The display control unit 113 adds information relevant to the presence or absence of the bus bay to the alert message based on the bus bay information retained in the bus bay information storage unit 106.

Figure 14:
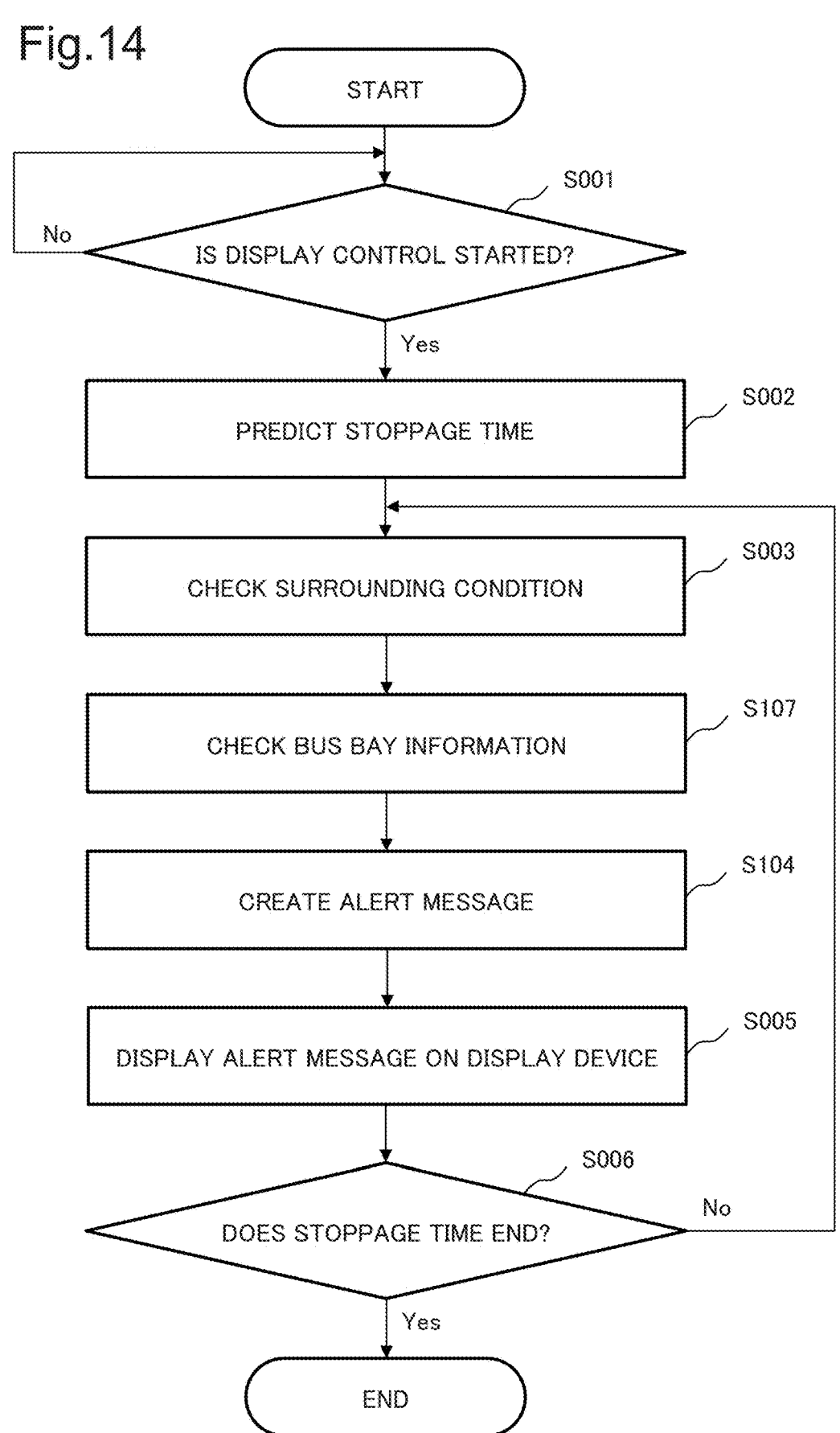
FIG. 14 is a flowchart illustrating an operation of an alert message display device of the second example embodiment of the present disclosure.

Hereinafter, the operation of the present example embodiment will be described with reference to the drawings. FIG. 14 is a flowchart illustrating the operation of the alert message display device 100*a* of the second example embodiment of the present disclosure. A difference from the operation of the alert message display device 100 of the first example embodiment illustrated in FIG. 11 is that a step (S107) of checking the bus bay information is added between step S003 and step S004.

The alert message display device 100*a* that has checked the bus bay information in step S107 creates an alert message by using the predicted stoppage time, the surrounding condition, and the bus bay information (step S104).

Figure 15:
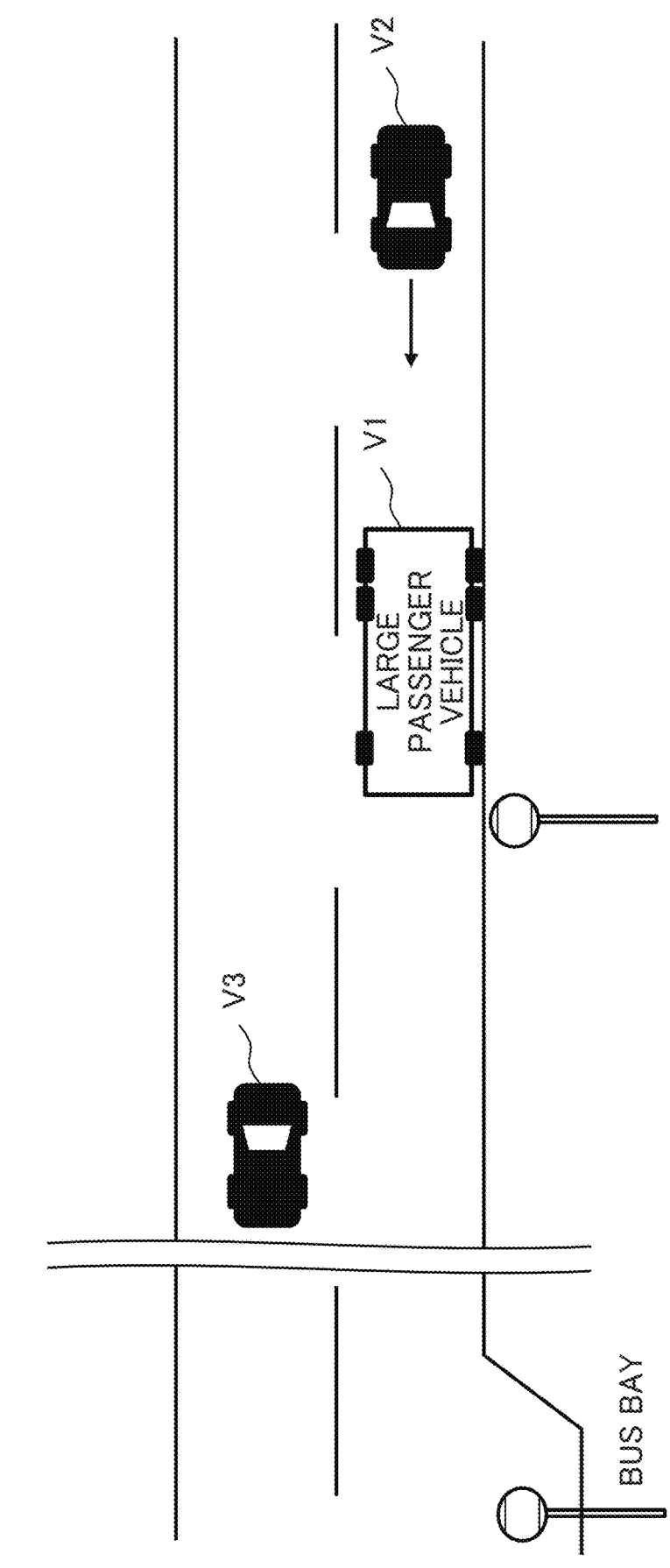
FIG. 15 is a diagram for illustrating the operation of the alert message display device according to the second example embodiment of the present disclosure.

For example, as illustrated in FIG. 15, in a condition where there is the bus bay at the next bus stop, in a case where it is detected that the vehicle V3 is approaching from the opposite lane during the predicted stoppage time, the alert message display device 100*a* displays an alert message including the presence of the bus bay at the next bus stop on the display device 14 installed at the rear of the vehicle body of the large passenger vehicle.

Figure 16:
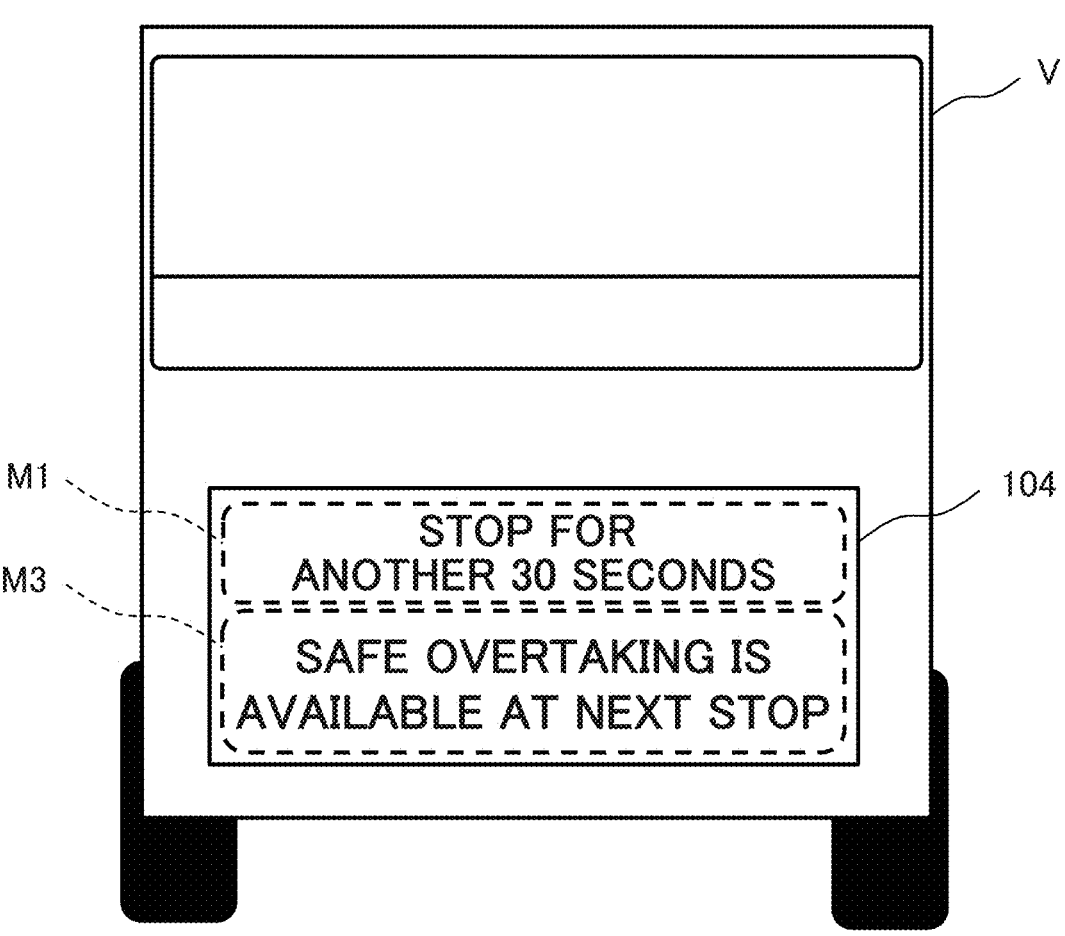
FIG. 16 is a diagram for illustrating the operation of the alert message display device according to the second example embodiment of the present disclosure.

FIG. 16 is an example of the alert message created by the alert message display device 100*a* under the condition of FIG. 15. In the example of FIG. 15, the message M1 of "Stop for another 30 seconds" indicating the predicted stoppage time is displayed in the upper side of the display device 104. In the example of FIG. 12, the alert message display device

100*a* displays a message M3 of "Safe overtaking is available at next stop" in the lower side of the display device 104.

As described above, by displaying the message M3 "Safe overtaking is available at next stop" on the display device 104, the driver of the following vehicle V2 can wait for the departure of the bus V1 with ease without performing unsafe overtaking. In the example of FIG. 16, only the message M1 of "Stop for another 30 seconds." and the message M3 of "Safe overtaking is available at next stop" are displayed, but similarly to the first example embodiment, the message M2 of "Caution overtaking, opposite vehicle is approaching" may be displayed together. The display form of the messages M1 to M3 may be a form in which, for example, the display illustrated in FIG. 12 and the display illustrated in FIG. 16 are alternately switched instead of simultaneously displaying all the messages. In the example of FIG. 16, the presence of the bus bay is not directly indicated that "Safe overtaking is available at next stop", but a more direct message such as "There is bus bay at the next stop, safe overtaking is available" may be displayed.

Third Example Embodiment

Figure 17:
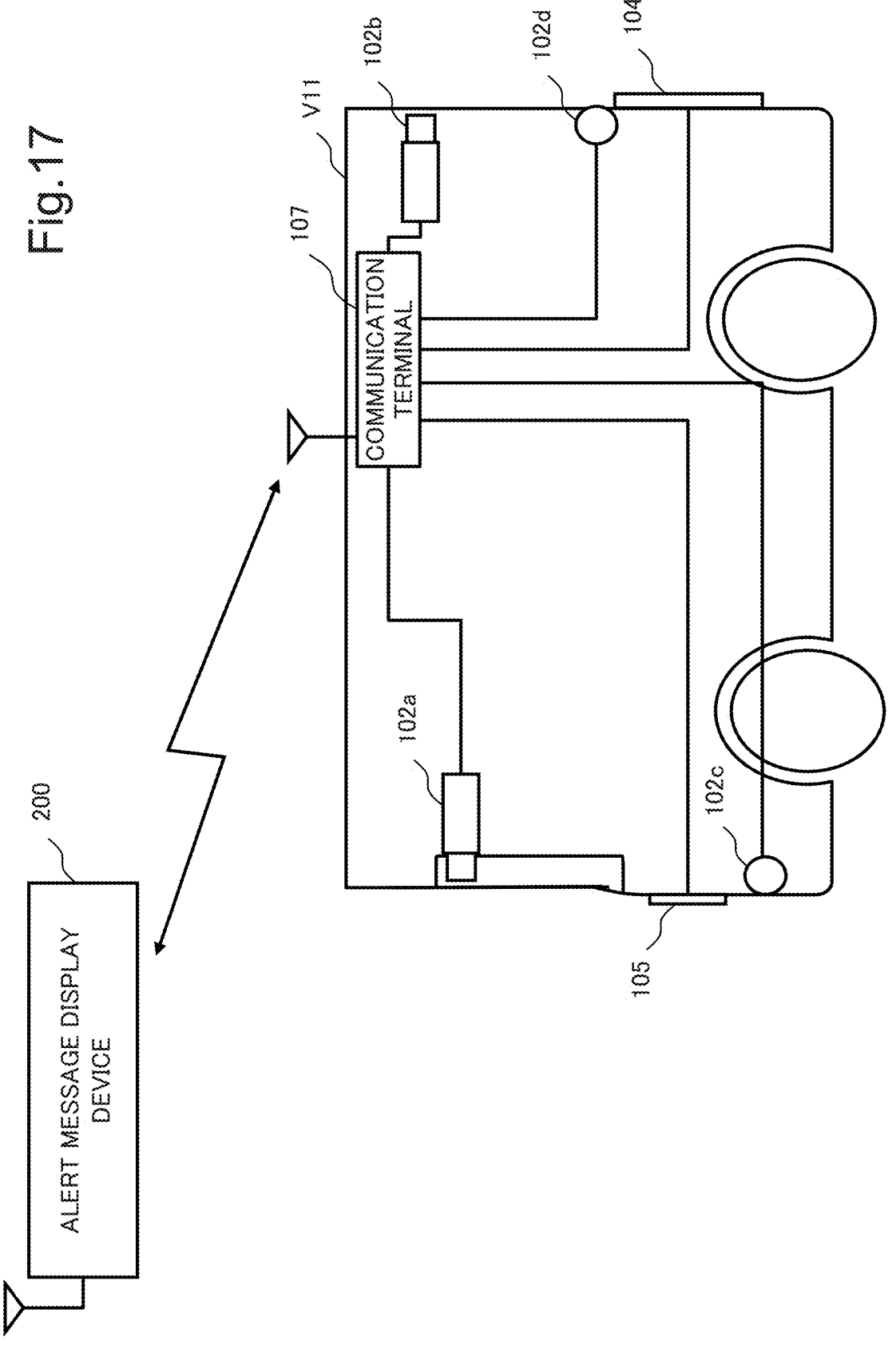
FIG. 17 is a diagram illustrating a configuration of a third example embodiment of the present disclosure.

In the first and second example embodiments described above, it has been described that the alert message display devices 100 and 100*a* are installed in the large passenger vehicle (the bus) V1, but the alert message display device may be installed outside the large passenger vehicle (the bus) V1. Next, a third example embodiment in which an external alert message display device displays an alert message on a display device of a large passenger vehicle (hereinafter, a "bus") V11 will be described in detail with reference to the drawings. FIG. 17 is a diagram illustrating the configuration of the third example embodiment of the present disclosure. Referring to FIG. 17, a configuration including a bus V11 and an alert message display device 200 that displays an alert message on the bus V11 is illustrated.

The bus V11 includes two cameras 102*a* and 102*b*, two LiDARs 102*c* and 102*d*, the display devices 104 and 105, and a communication terminal 107. The communication terminal 107 transmits data such as the images of the cameras 102*a* and 102*b*, the LiDARs 102*c* and 102*d*, a vehicle speed, and an operation state of a direction indicator to the alert message display device 200 as sensing information. The cameras 102*a* and 102*b*, the LiDARs 102*c* and 102*d*, and the display devices 104 and 105 are equivalent to those provided in the bus V1 of the first example embodiment, and thus, the description will be omitted. Such a bus V11 can be enabled by an in-vehicle terminal having a communication function and a vehicle capable of displaying various messages on a display device from the in-vehicle terminal. As a communication form between the communication terminal 107 and the alert message display device 200, various forms such as a form using a mobile communication network and a form using a roadside unit or the like installed around a road can be used.

Figure 18:
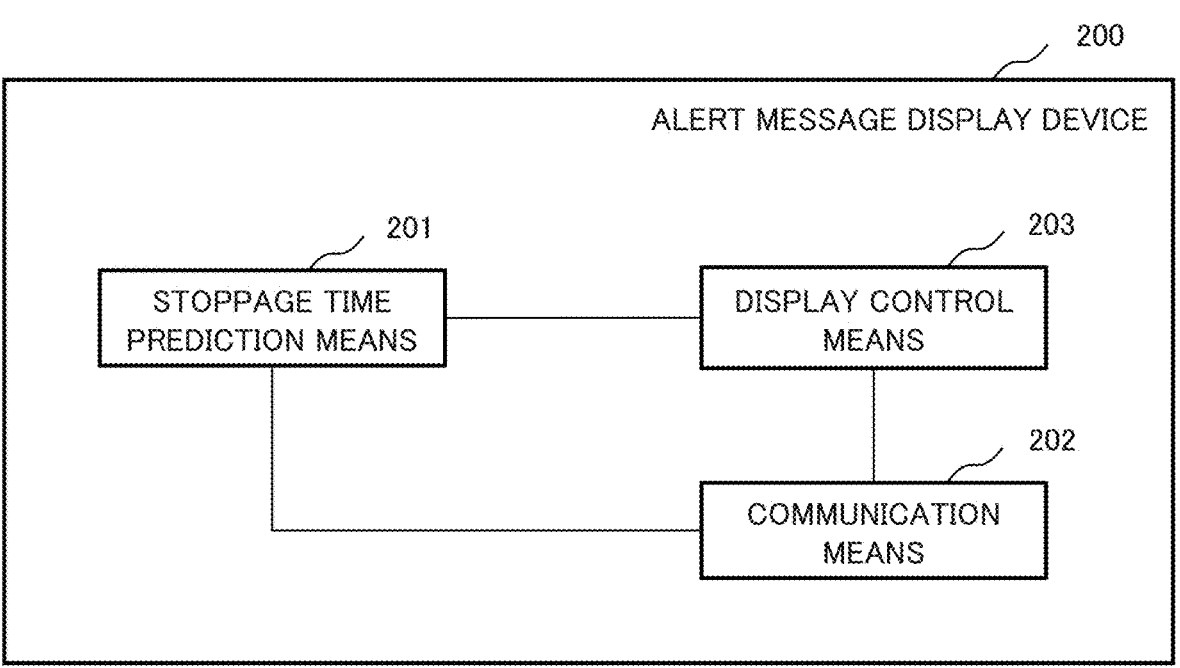
FIG. 18 is a diagram illustrating a configuration of an alert message display device according to the third example embodiment of the present disclosure.

FIG. 18 is a diagram illustrating the configuration of the alert message display device 200 according to the third example embodiment of the present disclosure. Referring to FIG. 18, the configuration of the alert message display device 200 including a stoppage time prediction unit 201, a display control unit 203, and a communication unit 202 is illustrated.

The communication unit 202 receives, as the sensing information, the data such as the images of the cameras 102*a* and 102*b*, the LiDARs 102*c* and 102*d*, the vehicle speed, and the operation state of the direction indicator from the bus V11, and sends the data to the stoppage time prediction unit 201 and the display control unit 203. The communication unit 202 transmits contents that are created by the display control unit 203 and to be displayed on the display devices 104 and 105 to the bus V11.

The stoppage time prediction unit 201 predicts a stoppage time at the next bus stop based on the information received from the bus V11. As a method for predicting the stoppage time, as in the first example embodiment, a method for summing the time required for each person to get on and off, based on the number of passengers scheduled to get off among passengers currently boarding on the bus V11 and the number of passengers waiting at the next bust stop is conceivable.

The display control unit 203 determines the contents to be displayed on the display devices 104 and 105 within the stoppage time predicted by the stoppage time prediction unit 201, and performs the display control on the display devices 104 and 105. More specifically, the display control unit 203 creates an alert message based on the surrounding condition of the large passenger vehicle, based on the predicted stoppage time and the sensing information received from the bus V11. The display control unit 203 transmits the alert message to be displayed on the display devices 104 and 105 to the bus V11.

The alert message display device 200 described above may include a dedicated device, but can also be enabled, for example, by installing a computer program for enabling functions associated to the stoppage time prediction unit 201 and the display control unit 203 in a roadside unit that provides various driving assistance or a MEC server that provides a service to the bus V11. "MEC" is an abbreviation for multi-access edge computing or mobile edge computing.

Figure 19:
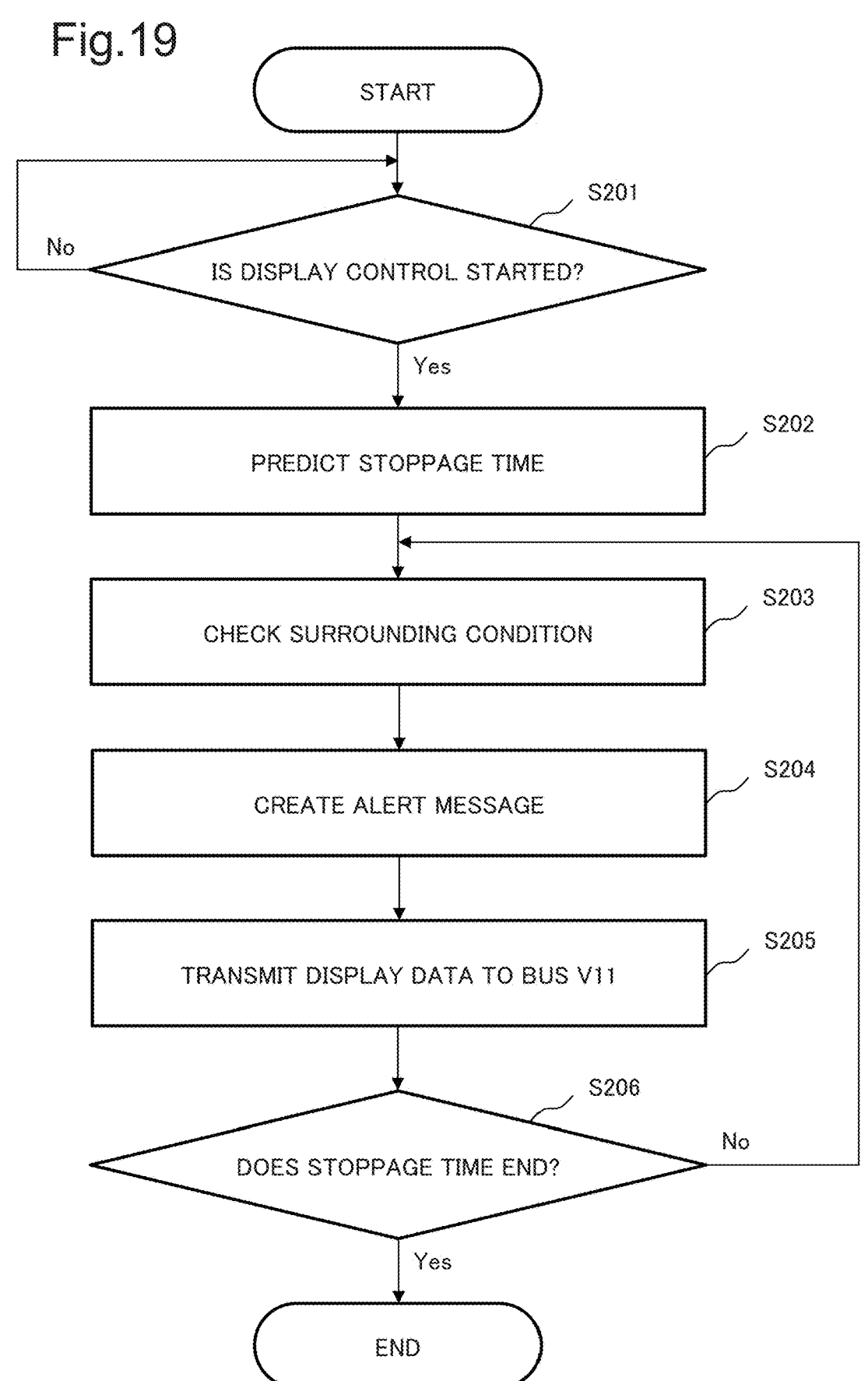
FIG. 19 is a flowchart illustrating an operation of the alert message display device of the third example embodiment of the present disclosure.

Hereinafter, the operation of the present example embodiment will be described with reference to the drawings. FIG. 19 is a flowchart illustrating the operation of the third example embodiment of the present disclosure. Referring to FIG. 19, first, the alert message display device 200 checks whether to start the display control on the display devices 104 and 105 based on the information received from the communication terminal 107 of the bus V11 (step S201). Whether to start the display control on the display devices 104 and 105 may be determined by, for example, whether the bus V11 is in a stoppage state or whether the bus is approaching a bus stop.

As a result of the determination, in a case where it is determined to start the display control on the display devices 104 and 105 (Yes in step S201), the alert message display device 200 predicts the stoppage time for the bus V11 (step S202).

Next, the alert message display device 200 checks the surrounding condition of the bus V11 based on the sensing data of the cameras 102*a* and 102*b* and the LiDARs 102*c* and 102*d* received from the communication terminal 107 of the bus V11 (step S203).

The alert message display device 200 creates an alert message to be displayed on display devices 104 and 105 by using the predicted stoppage time and the surrounding condition of bus V1 (step S204). For example, as illustrated in FIG. 2 described above, in a case where the opposite vehicle V3 is detected, the alert message display device 200 creates an alert message displaying "Stop for another 30 seconds" and "Caution overtaking, opposite vehicle is approaching" as illustrated in FIG. 12.

Next, the alert message display device 200 transmits data for displaying the created alert message to the communication terminal 107 of the bus V11 (step S205). When receiving the data, the communication terminal 107 of the bus V11 displays the alert message on the display devices 104 and 105.

The alert message display device 200 continues the operations in steps S203 to S205 until the stoppage time ends (No in step S206). When the stoppage time ends, the alert message display device 200 may instruct the communication terminal 107 of the bus V11 to perform a display such as "Departure". In addition, the alert message display device 200 may instruct the communication terminal 107 of the bus V11 to display various advertisements and the like during a period until the next alert message is displayed after the stoppage time ends.

As described above, according to the present example embodiment, the following vehicle of the bus V11 recognizes that there is an opposite vehicle and refrains from overtaking the bus V11. In this case, since the display device 104 displays that the time to wait is 30 seconds, the driver of the following vehicle can wait for departure of the bus V11 with ease without performing unsafe overtaking. It is obvious that the alert message display device 200 of the present example embodiment is also capable of displaying an alert message including the bus bay information by adding the bus bay information storage unit 106.

According to the configuration of the present example embodiment, the configuration on the bus V11 side can be simplified. According to the configuration of the present example embodiment, there is also an advantage that the alert message display device 200 is capable of controlling display devices of a plurality of buses. According to the configuration of the present example embodiment, there is also an advantage that the alert message display device 200 is capable of controlling a display device of the following vehicle of the bus or a vehicle traveling in the opposite lane.

Fourth Example Embodiment

Figure 20:
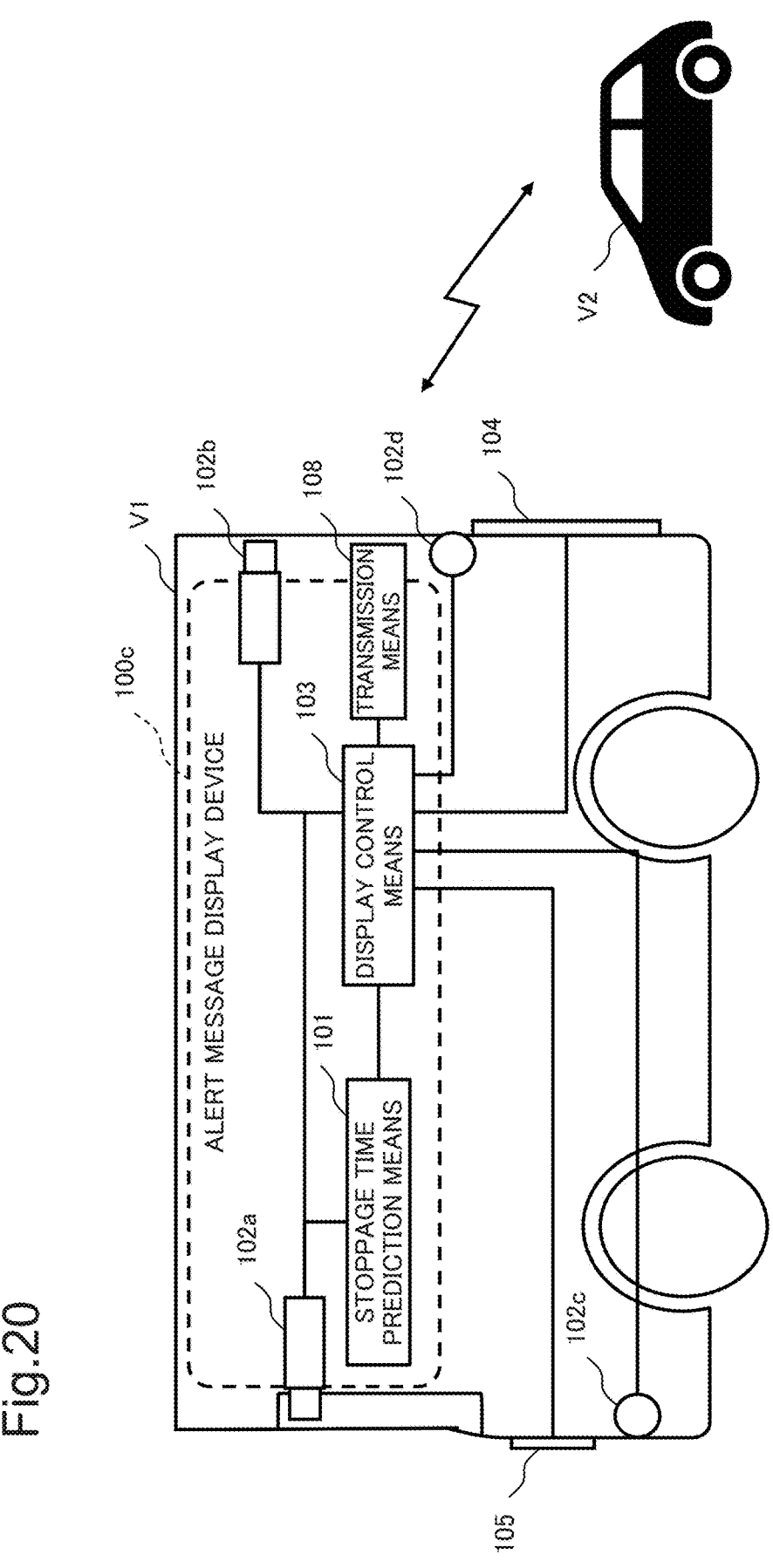
FIG. 20 is a diagram illustrating a configuration of a fourth example embodiment of the present disclosure.

In the first and second example embodiments described above, the alert message is displayed on the display device of the large passenger vehicle (the bus) V1, but a display destination of the alert message is not limited to the display device of the large passenger vehicle (the bus) V1. For example, as illustrated in FIG. 20, an alert message display device 100*c* may transmit the alert message to the following vehicle V2 or the vehicle (not illustrated) traveling in the opposite lane, and the display devices of these vehicles may display the alert message. In this case, a transmission unit 108 that transmits the alert message to the surrounding vehicle by using vehicle-to-vehicle communication or road-to-vehicle communication may be added to the alert message display device 100*c*.

According to the present example embodiment, it is possible to appropriately issue an alert even in a case where the display devices 104 and 105 of the large passenger vehicle V1 are difficult to watch due to the afternoon sun or the like. According to the present example embodiment, it is also possible to cope with a case where the display devices 104 and 105 are not mounted on the large passenger vehicle V1.

Fifth Example Embodiment

Figure 21:
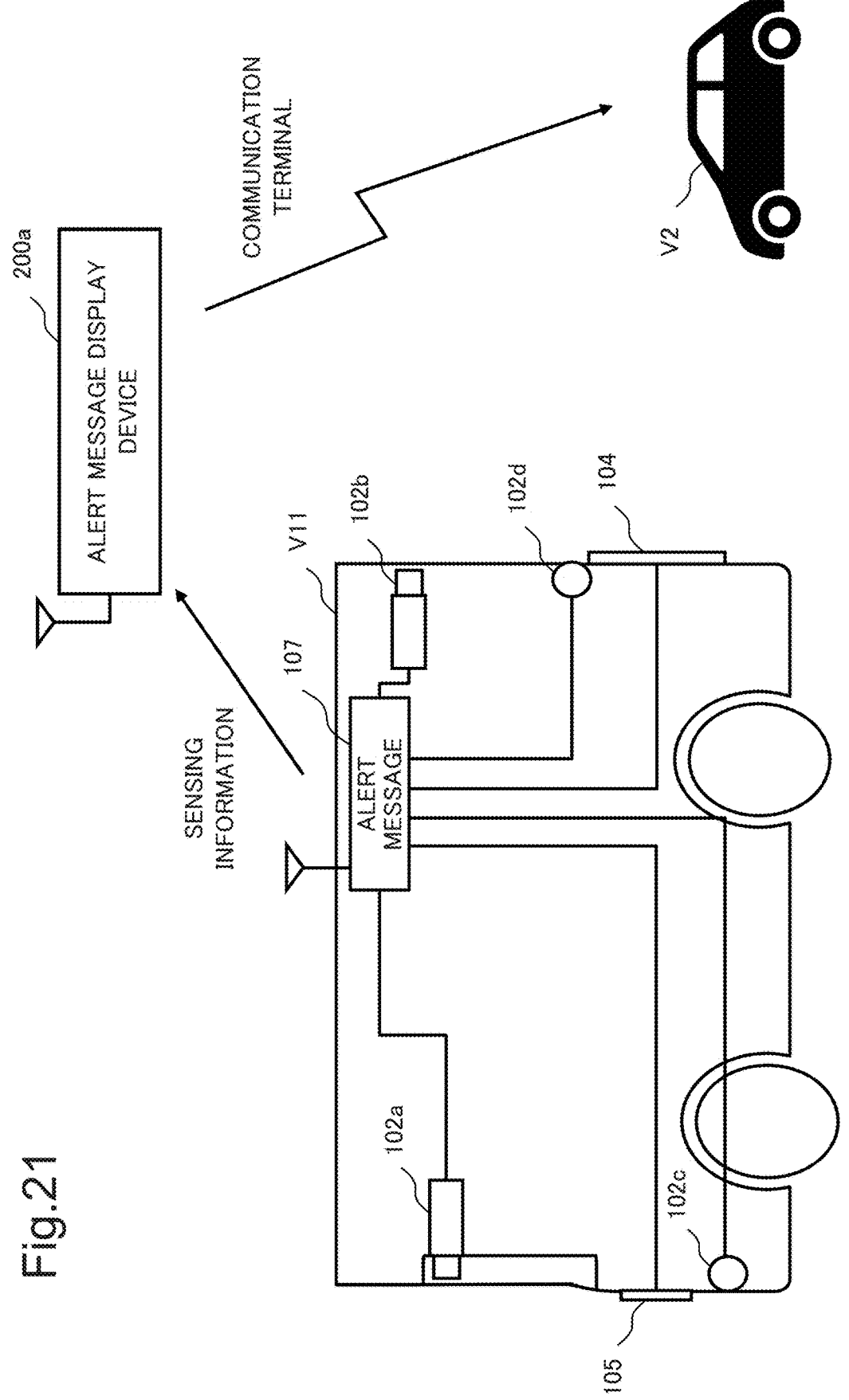
FIG. 21 is a diagram illustrating a configuration of a fifth example embodiment of the present disclosure.

Similarly, in the third example embodiment, the display destination of the alert message can also be the display device of the following vehicle or the vehicle (not illustrated) traveling in the opposite lane. For example, as illustrated in FIG. 21, an alert message display device 200*a* may transmit an alert message to the following vehicle V2 to issue an alert. In this case, the communication unit 202 of the alert message display device 200a functions as a transmission unit that transmits the alert message to the following vehicle V2 and the like.

Similarly to the fourth example embodiment of the present example embodiment, it is possible to appropriately issue an alert even in a case where the display devices 104 and 105 of the large passenger vehicle V11 are difficult to watch due to the afternoon sun or the like. According to the present example embodiment, it is possible to cope with a case where the display devices 104 and 105 are not mounted on the large passenger vehicle V11.

Each example embodiment of the present disclosure has been described above, but the present disclosure is not limited to the above-described example embodiments, and further modifications, substitutions, and adjustments can be made without departing from the basic technical idea of the present disclosure. For example, the network configuration, the configuration of each element, and the representation form of the data illustrated in each of the drawings are an example for assisting the understanding of the present disclosure, and are not limited to the configurations illustrated in the drawings.

For example, in each of the above-described example embodiments, an example in which the present disclosure is applied to a fixed route bus as an example of the large passenger vehicle has been described, but the present disclosure is also applicable to a bus tram (a light rail system) or the like.

In the fourth and fifth example embodiments, the alert message display device transmits the alert message to the following vehicle V2 or the vehicle (not illustrated) traveling in the opposite lane, but the alert message may be displayed on another terminal. For example, the alert message display device may transmit a message associated to the alert message to a mobile terminal of a pedestrian or the like positioned around the large passenger vehicles V1 and V11 to notify a danger that may occur due to the stoppage of the large passenger vehicles V1 and V11.

(Hardware Configuration)

Figure 22:
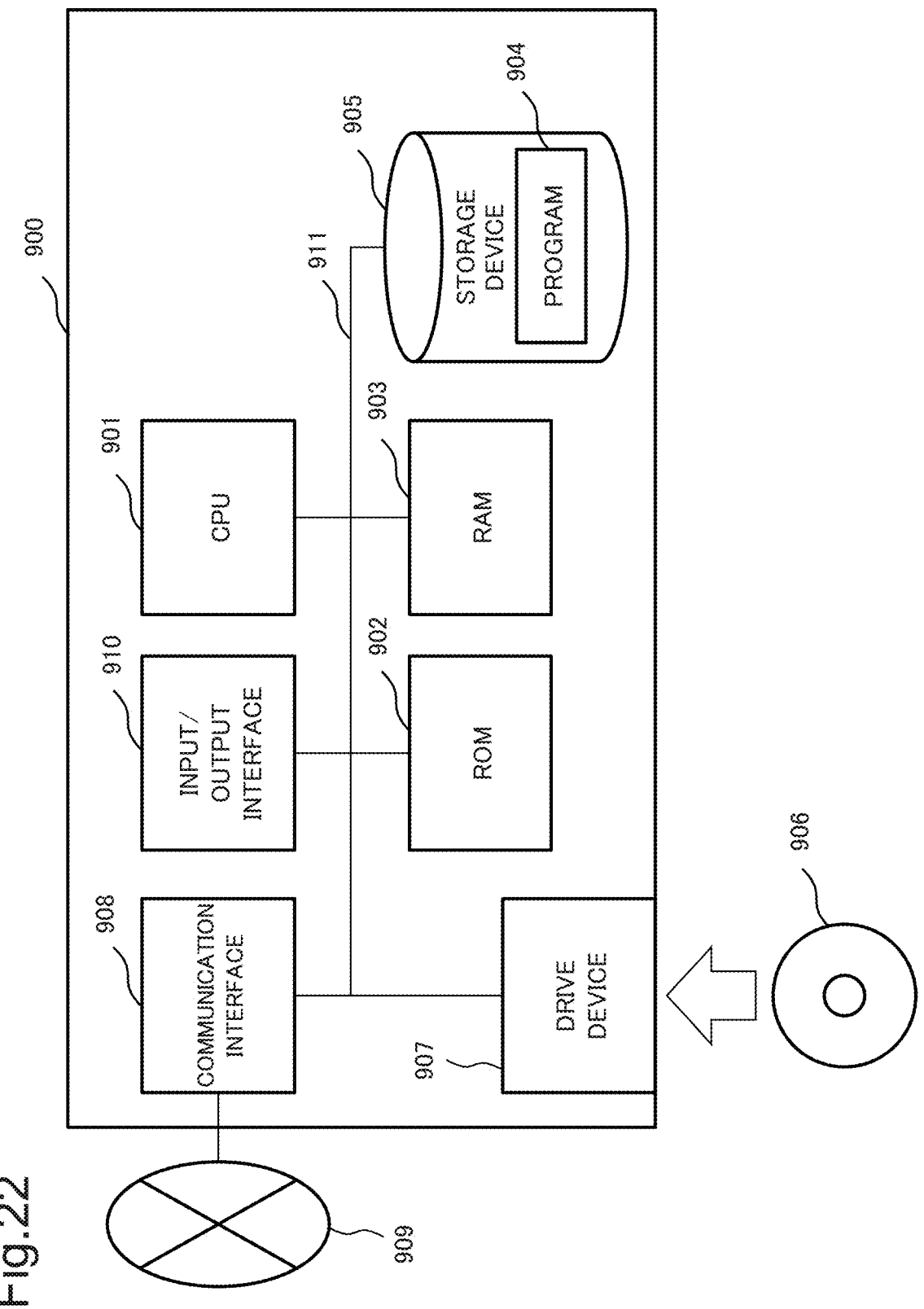
FIG. 22 is a diagram illustrating a configuration of a computer capable of functioning as the alert message display device of the present disclosure.

In each example embodiment of the present disclosure, each constituent of each device indicates a block of functional unit. A part or all of each constituent of each device is enabled by, for example, any combination between an information processing device 900 and a program as illustrated in FIG. 22. FIG. 22 is a block diagram illustrating an example of a hardware configuration of the information processing device 900 that enables each constituent of each device. The information processing device 900 has the following configuration as an example.

Central Processing Unit (CPU) 901
Read Only Memory (ROM) 902
Random Access Memory (RAM) 903
Program 904 Loaded to RAM 903.
Storage Device 905 Storing Program 904
Drive Device 907 for Performing Reading and Writing of Recording Medium 906
Communication Interface 908 Connected to Communication Network 909
Input/Output Interface 910 for Performing Input/Output of Data
Bus 911 Connecting Each Constituent Each constituent of each device in each example embodiment is enabled by the CPU 901 acquiring and executing the program 904 for enabling these functions. That is, the CPU 901 of FIG. 22 may execute a stoppage time prediction program and an alert message creation program to perform update processing of each calculation parameter stored in the RAM 903, the storage device 905, or the like. The program 904 for enabling the function of each constituent of each device is stored in advance in a program recording medium such as the storage device 905 or the ROM 902, for example, and is read by the CPU 901 as necessary. The program 904 may be supplied to the CPU 901 via the communication network 909, or may be stored in advance in the program recording medium 906, and the drive device 907 may read the program and supply the program to the CPU 901.

The program 904 is capable of displaying a processing result including an intermediate state for each stage via the display device as necessary, or communicating with the outside via the communication interface. The program 904 can be recorded in a computer-readable (non-transitory) storage medium.

There are various modification examples of a method for enabling each device. For example, each device may be enabled by any combination between the information processing device 900 separate for each constituent and the program. A plurality of constituents included in each device may be enabled by any combination between one information processing device 900 and the program. That is, the present disclosure can be enabled by a computer program that causes the communication terminal or the network control device described in the first to third example embodiments, and the processor mounted in such devices to execute each of the above-described processing pieces by using the hardware.

A part or all of each constituent of each device is enabled by another general-purpose or dedicated circuit, processor, and the like, or a combination between the circuit, the processor, and the like. Such constituents may be configured by a single chip or may be configured by a plurality of chips connected via a bus.

A part or all of each constituent of each device may be enabled by a combination between the above-described circuit or the like and the program.

In a case where a part or all of each constituent of each device is enabled by a plurality of information processing devices, circuits, and the like, the plurality of information processing devices, circuits, and the like may be arranged in a centralized manner or in a distributed manner. For example, the information processing device, the circuit, and the like may be enabled as a form in which each of the information processing device, the circuit, and the like is connected via the communication network, such as a client and server system or a cloud computing system.

Each of the above-described example embodiments is a preferred example embodiment of the present disclosure, and the scope of the present disclosure is not limited only to each of the above-described example embodiments. That is, it is possible for a person skilled in the art to make modifications and substitutions of the above-described example embodiments without departing from the gist of the present disclosure, and to construct a mode in which various modifications are made.

The whole or part of the example embodiments disclosed above can be described as, but not limited to, the following supplementary notes.

Supplementary Note 1

An alert message display device, including:
a stoppage time prediction means configured to predict a stoppage time for a large passenger vehicle that is stopped or scheduled to be stopped;
a sensing means configured to sense a surrounding condition of the large passenger vehicle; and
a display control means configured to display an alert message based on the surrounding condition of the large passenger vehicle on a display device installed on an outer surface of the large passenger vehicle, based on the stoppage time and the surrounding condition of the large passenger vehicle.

Supplementary Note 2

The alert message display device is capable of adopting a configuration in which the message is displayed on the display device installed on the outer surface of the large passenger vehicle as the predetermined display device.

Supplementary Note 3

The alert message display device is capable of adopting a configuration in which the stoppage time prediction means predicts the stoppage time based on the number of passengers scheduled to get on and off at a next stoppage position.

Supplementary Note 4

The alert message display device is capable of adopting a configuration further including a transmission means configured to transmit the alert message to a following vehicle of the large passenger vehicle or a vehicle traveling in an opposite lane.

Supplementary Note 5

The alert message display device is capable of adopting a configuration in which
the display device is disposed at a position visually recognizable from a rear side of the large passenger vehicle, and
the display control means determines whether a vehicle is approaching from an opposite lane during the stoppage time, and displays a predetermined alert message on the display device disposed at the position visually recognizable from the rear side of the large passenger vehicle when it is determined that the vehicle is approaching from the opposite lane.

Supplementary Note 6

The alert message display device is capable of adopting a configuration in which
the display device is disposed at the position visually recognizable from the rear side of the large passenger vehicle, and
the display control means determines whether there is a pedestrian crossing a road in front of the large passenger vehicle during the stoppage time, and displays a predetermined alert message on the display device disposed at the position visually recognizable from the rear side of the large passenger vehicle when it is determined that there is the pedestrian crossing the road in front of the large passenger vehicle.

Supplementary Note 7

The alert message display device is capable of adopting a configuration in which
the display device is disposed at a position visually recognizable from a front side of the large passenger vehicle, and
the display control means determines whether overtaking the large passenger vehicle is performed during the stoppage time, and displays a predetermined alert message on the display device disposed at the position visually recognizable from the front side of the large passenger vehicle when it is determined that the overtaking the large passenger vehicle is performed.

Supplementary Note 8

The alert message display device is capable of adopting a configuration in which
the display device is disposed at the position visually recognizable from the front side of the large passenger vehicle, and
the display control means determines whether there is a pedestrian crossing a road behind the large passenger vehicle during the stoppage time, and displays a predetermined alert message on the display device disposed at the position visually recognizable from the front side of the large passenger vehicle when it is determined that there is the pedestrian crossing the road behind the large passenger vehicle.

Supplementary Note 9

The alert message display device is capable of adopting a configuration further including
a storage means configured to store information on whether a bus bay is installed at a stop on a traveling route of the large passenger vehicle, in which
the display control means determines whether a bus bay is installed at a next stop at which the large passenger vehicle stops, and displays a message for notifying a presence of the bus bay on the display device disposed at the position visually recognizable from the rear side of the large passenger vehicle when it is determined that the bus bay is installed at the next stop at which the large passenger vehicle stops.

Supplementary Note 10

The alert message display device is capable of adopting a configuration further including
a transmission means configured to transmit the alert message to a surrounding vehicle instead of displaying the message on the predetermined display device.

Supplementary Note 11

An alert message display method, including:
predicting a stoppage time for a large passenger vehicle that is stopped or scheduled to be stopped;
sensing a surrounding condition of the large passenger vehicle; and
displaying an alert message based on the surrounding condition of the large passenger vehicle on a predetermined display device, based on the stoppage time and the surrounding condition of the large passenger vehicle.

Supplementary Note 12

A program recording medium recording a program for allowing a computer to execute:

processing of predicting a stoppage time for a large passenger vehicle that is stopped or scheduled to be stopped;

processing of sensing a surrounding condition of the large passenger vehicle; and processing of displaying an alert message based on the surrounding condition of the large passenger vehicle on a predetermined display device, based on the stoppage time and the surrounding condition of the large passenger vehicle.

The forms of Supplementary Notes 9 and 10 described above can be expanded to the forms of Supplementary Notes 2 to 8, as with Supplementary Note 1.

It is to be noted that each disclosure of the above patent documents is incorporated herein by reference, and can be used as a basis or a part of the present disclosure as necessary. Within the frame of the entire disclosure (including claims) of the present disclosure, it is possible to change and adjust the example embodiments or examples further based on the basic technical idea. Various combinations or selections (including partial deletions) of various disclosed elements (including each element of each claim, each element of each example embodiment or example, each element of each drawing, and the like) can be made within the frame of the disclosure of the present disclosure. That is, it is obvious that the present disclosure includes various modifications and corrections that can be made by a person skilled in the art in accordance with the entire disclosure including the claims and the technical idea. In particular, for numerical ranges set forth herein, any numerical value or sub-range included within the range should be construed as being specifically described, even when not stated otherwise. It is also considered that each respect disclosed in the cited documents described above is included in the respects disclosed in the present application to use a part or all of the respects disclosed in the cited documents in combination with the respects described in the present specification, as part of the disclosure of the present disclosure, in accordance with the gist of the present disclosure as necessary.

REFERENCE SIGNS LIST 10, 100, 100a, 100c, 200, 200a alert message display device
11, 101, 201 stoppage time prediction means
12 sensing means
13, 103, 113, 203 display control means
14, 15 display device
102a, 102b camera
102c, 102d LiDAR
104, 105 display device
106 bus bay information storage means
107 communication terminal
108 transmission means
202 communication means
900 information processing device
901 central processing unit (CPU)
902 read only memory (ROM)
903 random access memory (RAM)

904 program
905 storage device
906 recording medium
907 drive device
908 communication interface
909 communication network
910 input/output interface
911 bus
B1 bicycle
P1 pedestrian
M1 to M3 message
V1 large passenger vehicle (bus)
V2 following vehicle
V3 opposite vehicle

What is claimed is:

1. An alert message display device, comprising:
a memory storing instructions; and
at least one processor configured to execute the instructions to:
predict a stoppage time for a large passenger vehicle that is stopped or scheduled to be stopped;
sense, by one or more sensors, a surrounding condition of the large passenger vehicle during the stoppage time;
determine whether a vehicle is approaching from an opposite lane during the stoppage time; and
display, when it is determined that the vehicle is approaching from the opposite lane, a predetermined alert message on a first display device that is disposed at a position visually recognizable from a rear side of the large passenger vehicle.

2. The alert message display device according to claim 1, wherein the first display device is a display device installed on an outer surface of the large passenger vehicle.

3. The alert message display device according to claim 1, wherein
the at least one processor is further configured to execute the instructions to:
predict the stoppage time based on a number of passengers scheduled to get on and off at a next stoppage position.

4. The alert message display device according to claim 1, wherein
the at least one processor is further configured to execute the instructions to:
transmit an alert message to a following vehicle of the large passenger vehicle or a vehicle traveling in an opposite lane.

5. The alert message display device according to claim 1, wherein
the at least one processor is further configured to execute the instructions to:
determine whether there is a pedestrian crossing a road in front of the large passenger vehicle during the stoppage time; and
display a predetermined alert message on the first display device when it is determined that there is the pedestrian crossing the road in front of the large passenger vehicle.

6. The alert message display device according to claim 1, wherein
a second display device is disposed at a position visually recognizable from a front side of the large passenger vehicle, and
the at least one processor is further configured to execute the instructions to:
determine whether overtaking the large passenger vehicle is performed during the stoppage time; and display a predetermined alert message on the second display device when it is determined that the overtaking the large passenger vehicle is performed.

7. The alert message display device according to claim 1, wherein a second display device is disposed at the position visually recognizable from the front side of the large passenger vehicle, and the at least one processor is further configured to execute the instructions to:

determine whether there is a pedestrian crossing a road behind the large passenger vehicle during the stoppage time; and display a predetermined alert message on the second display device when it is determined that there is the pedestrian crossing the road behind the large passenger vehicle.

8. The alert message display device according to claim 1, wherein the at least one processor is further configured to execute the instructions to:

store information on whether a bus bay is installed at a stop on a traveling route of the large passenger vehicle determine whether a bus bay is installed at a next stop at which the large passenger vehicle stops; and display a message for notifying a presence of the bus bay on the first display device when it is determined that the bus bay is installed at the next stop at which the large passenger vehicle stops.

9. The alert message display device according to claim 1, wherein the at least one processor is further configured to execute the instructions to:

transmit the predetermined alert message to a surrounding vehicle instead of displaying the predetermined alert message on the first display device.

10. An alert message display method, comprising:

predicting a stoppage time for a large passenger vehicle that is stopped or scheduled to be stopped;

sensing, by one or more sensors, a surrounding condition of the large passenger vehicle during the stoppage time;

determining whether a vehicle is approaching from an opposite lane during the stoppage time; and displaying, when it is determined that the vehicle is approaching from the opposite lane, a predetermined alert message on a first display device disposed at a position visually recognizable from a rear side of the large passenger vehicle.

11. A program recording medium non-transitorily recording a program for causing a computer to execute processes of:

predicting a stoppage time for a large passenger vehicle that is stopped or scheduled to be stopped;

sensing, by one or more sensors, a surrounding condition of the large passenger vehicle during the stoppage time;

determining whether a vehicle is approaching from an opposite lane during the stoppage time; and displaying, when it is determined that the vehicle is approaching from the opposite lane, a predetermined alert message on a first display device disposed at a position visually recognizable from a rear side of the large passenger vehicle.

\* \* \* \* \*